(12) United States Patent
Livingston et al.

(10) Patent No.: US 6,612,918 B2
(45) Date of Patent: Sep. 2, 2003

(54) POULTRY CAGE STAGING AND FILLING METHOD AND APPARATUS

(75) Inventors: Bernard Livingston, Nacogdoches, TX (US); John Holladay, Winterville, GA (US)

(73) Assignee: Bright Coop Co., Nacogdoches, TX (US)

( * ) Notice: Subject to any disclaimer, the term of this patent is extended or adjusted under 35 U.S.C. 154(b) by 0 days.

(21) Appl. No.: 09/931,516

(22) Filed: Aug. 16, 2001

(65) Prior Publication Data
US 2002/0072317 A1 Jun. 13, 2002

Related U.S. Application Data
(60) Provisional application No. 60/225,680, filed on Aug. 16, 2000.

(51) Int. Cl.$^7$ .................................................. A22B 5/00
(52) U.S. Cl. ........................................ 452/53; 119/846
(58) Field of Search ............................ 452/53; 119/843, 119/846, 845, 455, 489

(56) References Cited

U.S. PATENT DOCUMENTS

| | | | |
|---|---|---|---|
| 3,420,211 A | 1/1969 | Hartvickson | |
| 3,672,335 A | 6/1972 | Sanders | |
| 3,718,118 A | 2/1973 | Bibler | |
| 3,741,417 A | * 6/1973 | Blankenship | ................ 119/82 |
| 3,921,588 A | 11/1975 | Ledwell, Jr. | |
| 4,037,565 A | 7/1977 | Ledwell, Jr. | |
| 4,301,769 A | 11/1981 | Mola | |
| 4,365,591 A | 12/1982 | Wills et al. | |
| 4,467,745 A | 8/1984 | Ledwell et al. | |
| 4,508,062 A | 4/1985 | Berry et al. | |
| 4,513,689 A | 4/1985 | Berry et al. | |
| 4,600,351 A | 7/1986 | Nelson | |
| 4,669,423 A | 6/1987 | van den Brink | |

(List continued on next page.)

FOREIGN PATENT DOCUMENTS

| | | | |
|---|---|---|---|
| GB | 0 326 422 A2 | * 2/1989 | ................ 119/496 |
| JP | 02283225 | * 11/1990 | ................ 119/846 |

OTHER PUBLICATIONS

Lacy, Michael P. et al, "Mechanical Broiler Harvesting Finally Arrives," Poultry Digest, Aug./Sep. 1999.
Sales Brochure, Lewis/Mola PH2000, "The Way to Harvest in the New Millennium," Lewis Brothers Manufacturing, LLC., 1618 Golden Isles Hwy., Baxley, GA 31513.
Sales Brochure, "Chicken Cat Harvester Geflugel–Fangmaschine," JTT ApS, Industriparken 20 DK–1782 Bredstsen.

Primary Examiner—Peter M. Poon
Assistant Examiner—Joan M. Olszewski
(74) Attorney, Agent, or Firm—Robert E. Wise

(57) ABSTRACT

A series of multi-compartmented, multi-tier poultry cages are staged for loading by a poultry loader that moves transversely to the direction of a plurality of side-by-side poultry receiving and batching bins each having parallel conveyor belts longitudinally arranged for individual discharge of batches of poultry onto a conveyor belt of the poultry loader arranged for alignment with both individual bin conveyor belts, and individual front opening poultry cage compartments frontally presented by the cage stager. The stager removes a filled cage, relocates it to another position where it frontally faces in the same direction in which as an empty cage it was placed on the stager, for removal by a fork lift, while in the meantime another cage is placed on the stager and moved into position for filling, in a continuing process, until all poultry are loaded.

4 Claims, 15 Drawing Sheets

U.S. PATENT DOCUMENTS

| | | | |
|---|---|---|---|
| 4,736,710 A | 4/1988 | Nicolai | |
| 4,766,850 A | 8/1988 | O'Neill | |
| 4,900,292 A | 2/1990 | Berry et al. | |
| 5,101,767 A | 4/1992 | Williams et al. | |
| 5,259,811 A | 11/1993 | Berry | |
| 5,325,820 A | 7/1994 | Briggs et al. | |
| 5,361,727 A | 11/1994 | Berry | |
| 5,385,117 A | 1/1995 | Hollis et al. | |
| 5,469,815 A * | 11/1995 | Stross | 119/846 |
| 5,470,194 A | 11/1995 | Zegers | |
| 5,476,353 A | 12/1995 | Mola | |
| 5,592,902 A | 1/1997 | Horton | |
| 5,660,147 A | 8/1997 | Wills et al. | |
| 5,699,755 A | 12/1997 | Wills et al. | |
| 5,706,765 A | 1/1998 | Horton | |
| 5,743,217 A | 4/1998 | Jerome | |
| 5,791,854 A | 8/1998 | Cattaruzzi | |
| 5,863,174 A | 1/1999 | Mola | |
| 5,975,029 A | 11/1999 | Morimoto et al. | |
| 6,056,637 A * | 5/2000 | Freeland et al. | 452/53 |
| 6,341,687 B1 * | 1/2002 | Cattaruzzi | 198/802 |
| 2002/0078904 A1 * | 6/2002 | Cattaruzzi | 119/846 |

* cited by examiner

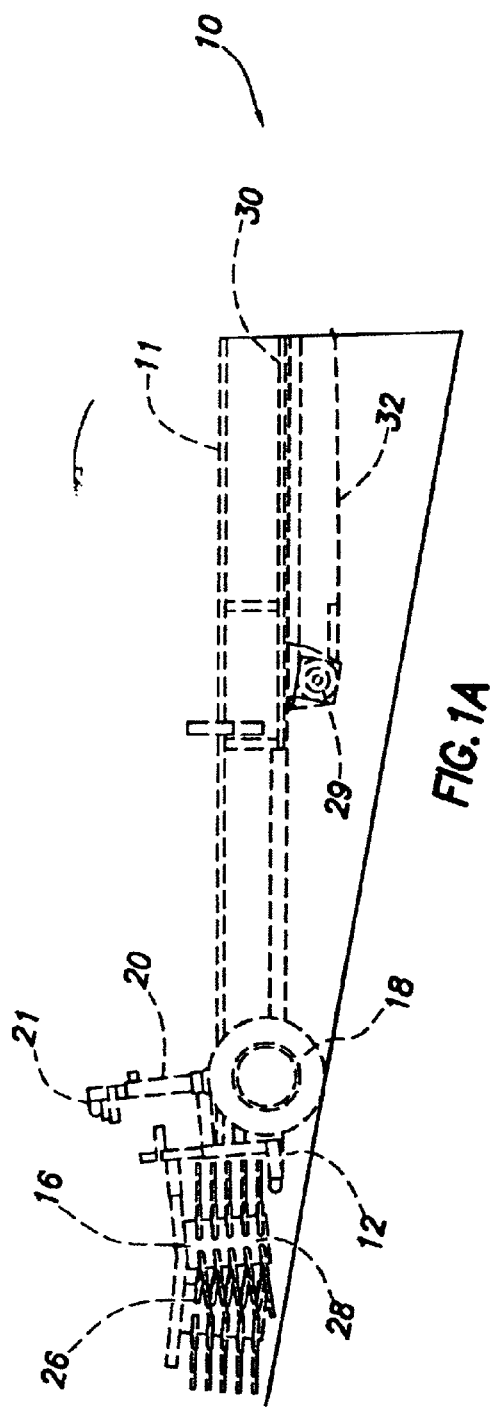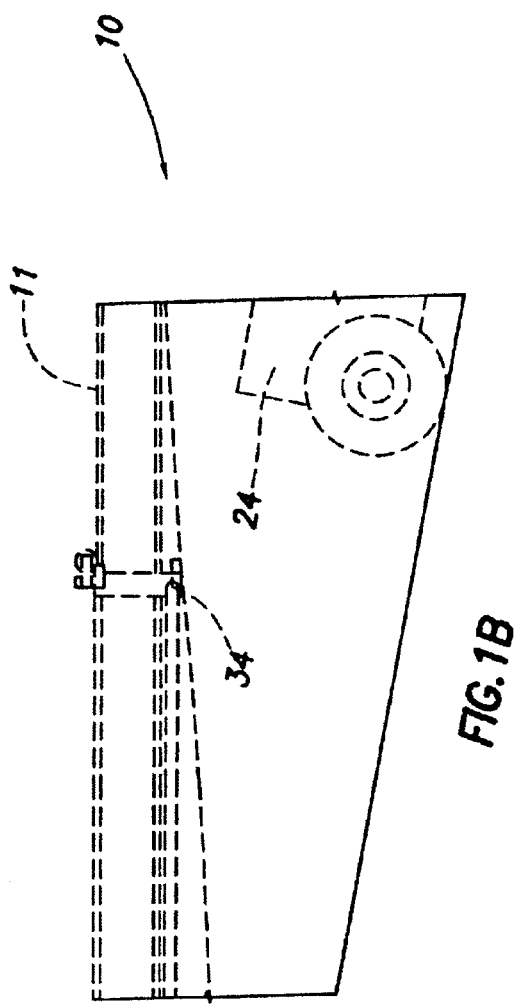

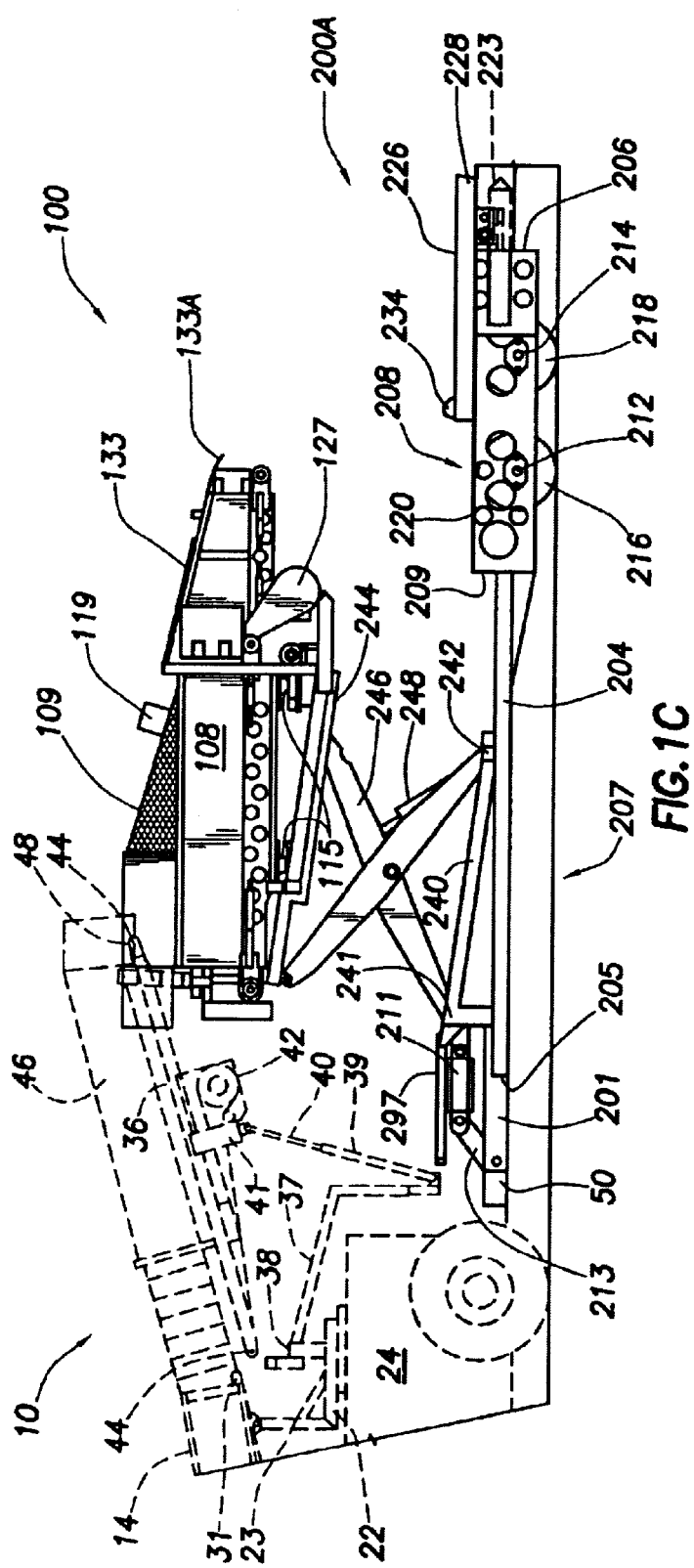
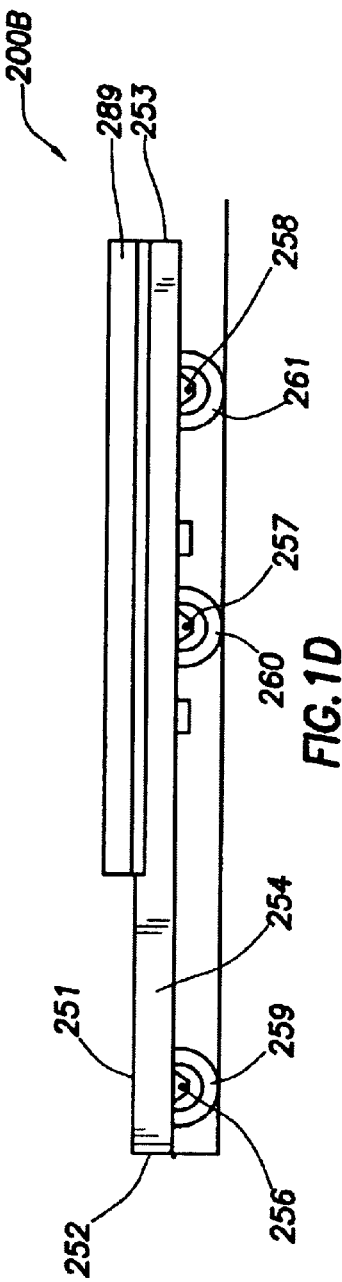
FIG.1C
FIG.1D

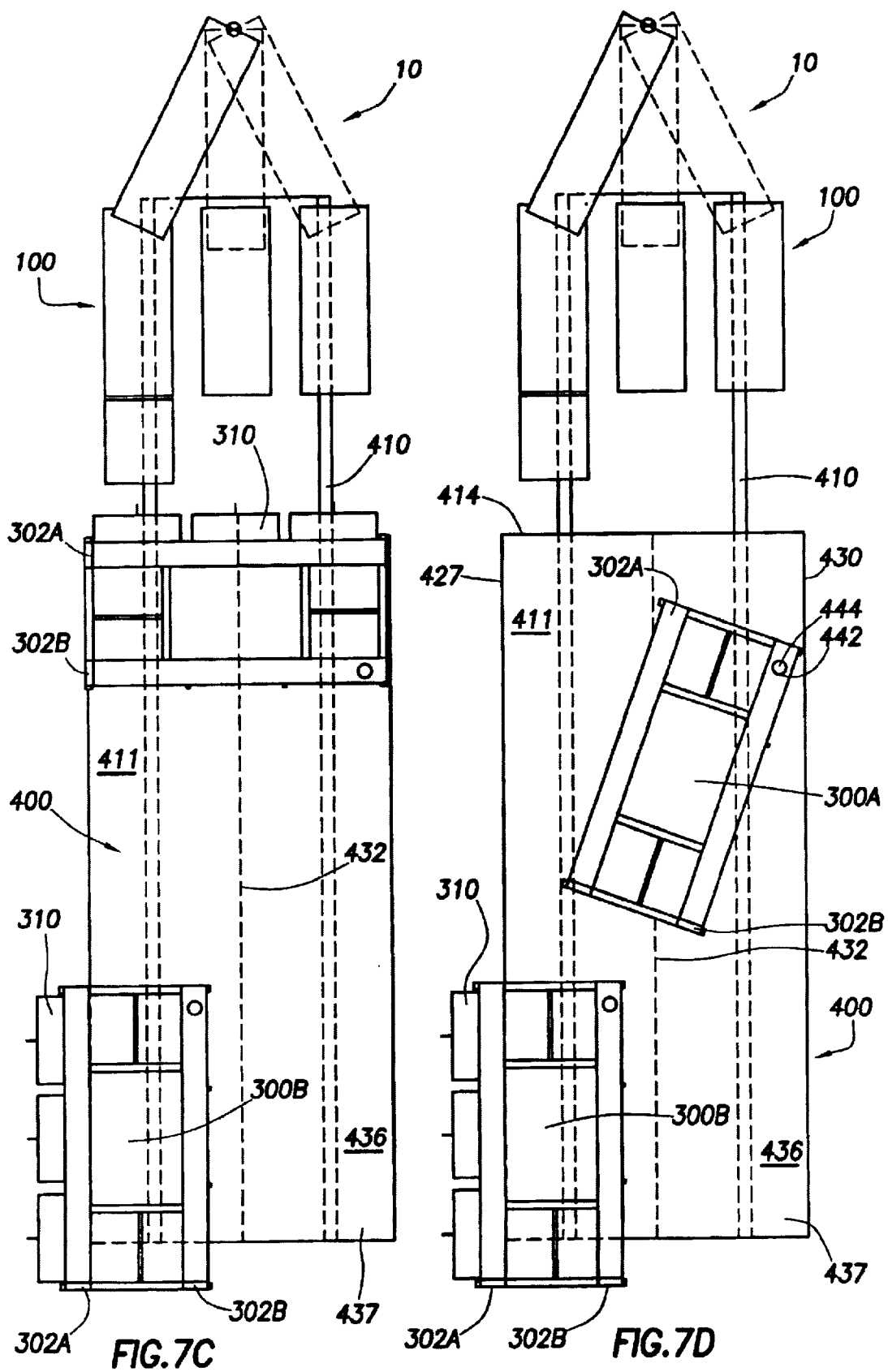

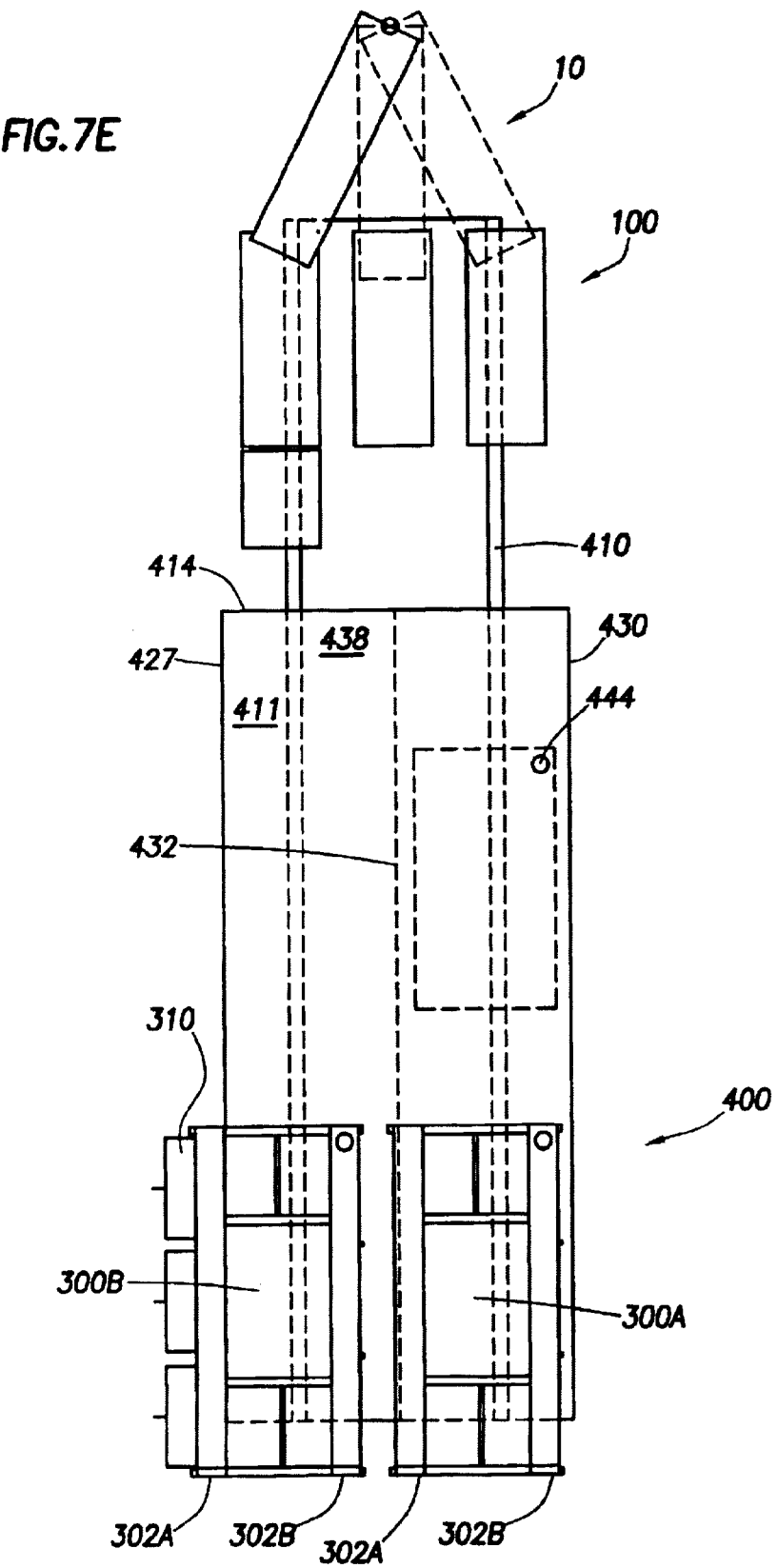

POULTRY CAGE STAGING AND FILLING METHOD AND APPARATUS

CROSS REFERENCE TO RELATED APPLICATION

The present application claims the benefit of 35 U.S.C. §111(b) Provisional Application Ser. No. 60/225,680, filed Aug. 16, 2000 and entitled "Apparatus and Method for Positioning Poultry Cages for Filling and Removal."

BACKGROUND OF THE INVENTION

This invention relates to method and apparatus for caging poultry caught at a growing site for live haul transport to processing plants where they are slaughtered and dressed for market.

The poultry industry today in the United States and in other countries provides a huge amount of the country's consumable protein, centered on chickens and turkeys. Poultry are raised from chicks to eating size free roaming in a structure called a "house", a "chicken house" in the case of chickens. Eating size is typically a five to six pound live weight for a "broiler" chicken destined for broiling, frying, grilling, or the like, heavier for chickens for stewing and the like, and often in the forty to fifty pound range for turkeys. When poultry have reached eating size, they are caught, caged and hauled to a poultry processing plant where they are slaughtered and dressed for market. The part of the poultry industry that is responsible for catching, caging and hauling the poultry to a poultry processing plant is called the "live-haul" industry. The term "poultry" or "bird" are used interchangeably and generically refer to chickens, turkeys or other fowl raised for consumption.

A typical modern chicken processing plant receives, slaughters and dresses from 50,000 to 300,000 chickens per day, and a few as many as 500,000 to 700,000 per day. The processing plant must have caged chickens at the plant ready to be unloaded and slaughtered in order to maintain a continuous operation. The live-haul operators are charged with this responsibility. The live-haul process has to be done efficiently and expeditiously in order both to keep the bird numbers flowing to the processing plant and to minimize bird death from holding the poultry too long in cages where massed body heat of the caged poultry causes them to dehydrate without chance of re-watering (especially in hot weather months).

The high daily throughput requirements of modern poultry processing plants in the United States has led to the development of improvements designed to facilitate rapid loading and unloading of caught poultry. Before these improvements were developed, caught poultry were deposited into wooden or plastic single compartment coops that opened at the top accessible from a closeable hatch. Coops were individually man-handled onto flatbed trailers and stacked in side-by-side columns to form rows of stacks that were then lashed to the trailer for transport to the processing plant. At the processing plant, these single compartment coops caused a bottleneck, because the chickens had to be withdrawn by hand. As processing plant slaughter line numbers and speed increased to meet growing sales demands, this bottleneck needed to be overcome, and in consequence, the modern steel poultry cage was developed and is universally used in today's high volume processing plants.

This cage is a multi-tied, multi-compartmented structure having over-the-center, spring loaded doors at the front of each compartment. The doors facilitate not only loading but unloading. At the processing plant the cage is tilted forward (towards the doors) causing the weight of the caged chickens to press against the doors until the spring load is overcome, snapping open the doors and allowed all the chickens in the cage to be dumped from the cage compartments onto wide conveyor collector belts leading to slaughter lines.

The modern steel poultry cage, now a design standard in the United States, is of a size that fits an over-the-road flatbed trailer, which is restricted in width to about eight feet for travel on public roads. Such cages for chickens, have tiers of side-by-side compartments (a row). Each compartment is directly over or under another compartment in a different tier, providing a column of vertically superimposed compartments. Each compartment has a solid fiberglass floor and a front opening, bottom hinged, over-the-center spring loaded solid door that closes a portal or front opening to the compartment. The cage tiers number four, five or six, and have two or three compartments per tier. In a cage having three compartments per tier (called a "three door" cage), the individual compartments run about four feet deep, are about a foot high, and are about 31 inches wide (side to side). In a "two door cage", the compartments are about 48 inches wide. The compartment width sets the length of the cage, about eight feet, since the length is essentially a combination of compartment widths. Compartment depth sets cage depth. Thus a cage is about eight feet long and four feet deep. A typical compartment holds about 17–20 chickens of five to six pounds for a load of about 100 pounds of chickens per compartment. A five tier "three door" cage (15 compartments) carries about up to about 260–300 chickens at a total of about 1500 pounds of chicken per cage.

Weighing in at 1500 pounds of chickens when filled, the poultry cages are provided with fork tubes built into them along the length of the cage to allow the entire cage to be lifted with a forklift. Fork spread of forklift trucks and cage rigidity mandate that the fork tube pair incorporated into the cage structure run along the length of the cage at the front and rear base of the cage, putting the tubes about four feet apart corresponding to cage depth. Cross members ties together the fork tubes.

A typical live haul crew has chicken catchers, a forklift truck driver and a truck driver for each truck towing a flatbed trailer loaded with cages. Operations using the poultry cages start at the processing plant where empty cages are placed with forklift trucks on flatbed trailers with the length of the cage running across the width of the trailer, the single orientation permitted by the run of the fork tubes where the only approach available to the forklift to load the length of the trailer is from the side. Cages are loaded side by side the length of the trailer, then another row of cages is stacked and lashed atop the bottom row.

A forklift truck accompanies the cages to the chicken house farm where grown chickens ready for slaughter are to be caught in the house and are caged for transport to the processing plant. At the farm, the driver of the forklift truck has certain logistical factors to observe, both in unloading and delivering empty cages to a catching crew, and in fetching filled cages and loading the filled cages on a flatbed trailer for transport to the processing plant. When loading filled cages onto the transport trailer, good practice is to place the cages on the trailer with the cage doors facing all one way, preferably to the front where the doors face the wind, for better efficiency in unloading the cages at the processing plant for dumping. If the forklift driver picks up a filled cage with the doors to the driver's right, in order to place the doors to the front of the trailer, the driver must approach the trailer from the right side of the trailer (viewed from the rear of the trailer to the front). If the forklift driver picks up a filled cage with the doors to the left, in order to place the doors to the front of the trailer, the driver must approach the trailer from the left side of the trailer.

At the poultry house farm, the forklift truck perpendicularly approaches the trailer carrying empty cages (now unlashed), spears a cage with the forks inserted into the cage fork tubes, lifts and removes the cage, and carries it into the chicken house. Inside, the forklift takes the cage to a working area and elevates one fork higher than the other to tilt the cage from rear to front (front higher than the back). A worker places a prop under the cage to fix the tilt, the forks are withdrawn, and a worker opens the cage doors. Chicken catchers grab poultry by the legs, several at a time, and push them into the tilted cage through the opened front. The inserted poultry instinctively want to right themselves immediately and move up to the opening of the compartment to escape. The solid and comparatively smooth plastic surface of the compartment floor is a new phenomenon to poultry raised on a rough litter surface, and the poultry have a more difficult time gaining purchase of it with their clawed feet. This difficulty combined with tilt of the smooth floor makes it harder for the self righting poultry to immediately scramble from the cage compartment. (As more birds are loaded in the tilted up cage, the birds gravitate to the back and load more weight to the rear than the front. If the cage is too steeply tilted, the cage will tip over backwards during loading. Experience has shown that a safe cage tilt angle is in the range of from about 11 to about 16 degrees from horizontal.)

During the time a cage is being filled, the forklift truck returns to the trailer, fetches another empty cage, brings it to the work area, tilts it by raising one fork more than the other, allows a crew member to prop it at the desired angle, withdraws the forks, and drives to the now filled cage, approaching it from a side that will position the cage doors to the left or right of the driver, whichever is the correct orientation for placing the cage on the trailer with the doors to the front of the trailer. The filled cage is forked from the proper side with the forks positioned one side higher than the other to fit the tubes at their relative elevation for the angle at which the cage is propped up. The cage is then lifted, the forks are adjusted to equal elevation thereby to level the cage, and the cage is carried out of the poultry house to the trailer upon which it is placed in proper orientation.

The speed with which the tilted cage is filled by the workers and the speed with which the tilted filled cage is retrieved and leveled by the forklift is important. The first poultry loaded in a compartment of the tilted cage are impressed by the weight of the later loaded poultry, which are "up-slope" to them in that compartment with the door closed. This "burying" of the poultry in the rear of a compartment continues so long as other compartments are being loaded and until the filled and tilted cage is retrieved and leveled by the forklift. If too long a time is taken to load the cage for retrieval or for the fork lift to pick up and level a cage already loaded, poultry at the rear of the cage risk smothering.

Modern poultry science permits raising about one chicken per 0.6 square foot of area. U.S. chicken houses typically are single story, about 40 feet wide, and from 300 feet long (12,000 square feet) to 500 feet long (20,000 square feet). A typical chicken house of from 12,000 to 20,000 sq. ft. may contain from about 20,000 to 33,000 chickens. Loading a three door five tier cage of 15 compartments each with about 20 five pound chickens (about 300 per cage), means that catching a 20,000 bird house requires about 66 cages (about three trailers) and a 30,000 bird house needs about 100 cages (about four trailers). A catcher typically catches several chickens in each hand and lifts them into an open cage compartment in the loading process. At a nominal five pounds per bird and two or three chickens per hand, each lift deposits up to 15 pounds, sometimes more, until all the chickens are caught and loaded. With nine catchers in a typical crew catching a 20,000 bird house, each catcher cages 5½ to 6 tons of chickens.

The physically demanding nature of chicken catching, the hugely increasing volume of chickens being processed for consumption, and a shrinking labor pool for this kind of work in the United States has led to efforts to automate and mechanize the catching and cooping process. These efforts, indeed, are international, with efforts in different countries focusing on the particular live haul problems found in those countries. In Europe, chicken raising and consumption has not advanced to the huge scale in the United States, and perhaps for that reason the front-doored steel cage construction in wide use in the United States has not been universally adapted there; instead mechanization there has developed for loading and handling plastic trays or drawers largely of open top construction.

Examples of U.S. Patents granted to European inventors and directed to catching and/or caging chickens in open top containers include:

TABLE 1

| | | |
|---|---|---|
| 4,669,423 | Open top trays | Netherlands |
| 4,669,423 | Open top trays | Netherlands |
| 4,736,710 | Open top trays | Netherlands |
| 5,470,194 | Side opening drawers | Netherlands |
| 5,975,029 | Open top trays | Netherlands |
| 4,365,591 | Open top drawers | U.K. |
| 4,766,850 | Side-opening cage | U.K. |
| 5,660,147 | Open top drawers | U.K. |
| 5,699,755 | Open top drawers | U.K. |

Generally, efforts to mechanize the chicken catching and caging process have fallen into either the catching process alone or that process combined with a process for cooping poultry after capture. There have been numerous designs.

Examples of patents granted for inventions for the bird catching methods or apparatus only include the following (all to European inventors):

TABLE 2

| | | |
|---|---|---|
| 4,508,062 | Berry et al. | U.K. |
| 4,513,689 | Berry et al. | U.K. |
| 4,900,292 | Berry et al. | U.K. |
| 5,259,811 | Berry et al. | U.K. |
| 5,361,727 | Berry et al. | U.K. |
| 5,863,174 | Mola | Italy |

Examples of patents granted for inventions for catching and cooping or just cooping captured poultry (specifically turkey in one particular case) are the following:

TABLE 3

| | | |
|---|---|---|
| 3,921,588 | Ledwell et al. | U.S. |
| 4,037,565 | Ledwell et al. | U.S. |
| 4,467,745 | Ledwell et al. | U.S. |
| 4,301,769 | Mola | Italy |
| 4,600,351 | Nelson | U.S. |
| 5,325,820 | Briggs et al. | U.S. |
| 5,385,117 | Hollis et al. | U.S. |

TABLE 3-continued

| 5,592,902 | Horton | U.S. |
|---|---|---|
| 5,706,765 | Horton | U.S. |
| 5,743,217 | Jerome | U.S. |

Among the patents listed in Table 3 are examples showing different approaches to staging coop frames or cages for serial loading of successive such coop frames or cages. Other patents directed only to staging successive frames or cages for loading include U.S. Pat. No. 5,476,353 to Mola and U.S. Pat. No. 5,791,854 to Cattaruzzi.

The foregoing designs have found only limited acceptance in the live haul industry, and the industry continues to demand a viable solution. Important considerations for a mechanized poultry cager include that it has to be transported on public roads to the poultry farm. At the poultry house, it should be able to enter the house and work there within width and height limitations imposed by frame of the house. Grower houses in the Unites States are not uniform in configuration. Some have a center post narrowing the span within which the equipment can travel. House end door heights and widths can be a limiting factor. Rafter heights range are normally about eight feet or more in the more modern houses in the Georgia, Arkansas, Texas and other southern chicken raising states. During the catching process, chicken feeder troughs and watering troughs typically are drawn up to the rafters to get them out of the way. This effectively reduces the overhead clearance for catching and caging equipment.

A mechanized poultry catching and caging operation that is to be usefully engaged in the United States must work with the modern steel poultry cages now standard in the United States, and must be supported by a constant supply of empty cages for filling, and at the same time, removal of cages already filled. A mechanized poultry cager should allow for maneuverability of cooperating forklift trucks which must bring it empty cages and remove filled cages. It should facilitate rapid cage filling and should be easy and simple to operate in order to maximize the skill levels of the labor pool who will be available to operate it. Machinery for providing a constant supply and removal of cages in addition should be narrow enough to be towed both over public roads and, necessarily, in poultry houses where the mechanized catching and loading operations must be supported. Further, it should integrate with the logistics for forklift operations at the farm site that are described above, allowing forklift placement and removal of cages in proper orientation for correct loading on a flatbed transport trailer.

U.S. Pat. Nos. 5,660,147 and 5,699,755, cited in Table 1 above, describe one method for handling coops in connection with catching and loading chickens, using a towed working trailer in which a rectangular cage frame is longitudinally placed on the right rear of the trailer, advanced and turned to the front of the trailer for filling, and returned longitudinally to the left rear for removal. The cage frames have open top slidable drawer coops. The coop drawers are slidable in and out from either side of the cage frame, so there is no actual front or rear to the frame and coops. Thus it is unimportant whether the right side or left side of the cage frame is placed longitudinally on the towed working trailer, advanced to the front, and returned to the rear. This cage cycling system does not work for a steel cages with front loading doors such as used in the United States where the orientation of the front loading doors must be taken into account. If the system described in these patents were used with a steel cage having front opening doors, it would be necessary to deposit the cage on the described right rear loading location with the doors oriented to the right side of the trailer in order to turn the doors to face the front, as indicated in these patents, for cage filling. This would result in the cage being returned to the rear offloading position with the doors oriented to the left side of the working trailer. Thus a forklift driver would be constrained to unload the front doored cages from the right side of the transport trailer and to load the filled cages onto the left side of the trailer. This is unsuitable for a general purpose device.

Some of the above cited patents describe mechanisms for staging and filling steel poultry cages having front opening doors, namely, U.S. Pat. Nos. 5,325,820, 5,592,902 and 5,706,765. U.S. Pat. No. 5,325,820, using a side filling process, places two cages on opposite sides of a conveyor aisle such that viewed from the rear of the apparatus, the cage on the left of the aisle has its doors on the right, and the cage on the right of the aisle has its doors on the left. Placement of the cages onto and removal of the cage from this apparatus requires forklift access to both sides of a transport trailer and is accordingly unsuitable for general use. U.S. Pat. No. 5,592,902, using a front filling process, places and removes a front doored cage with the doors to the same side, but cannot stage a second empty cage until after a first empty cage is filled and returned to an off loading position. U.S. Pat. No. 5,706,765, using another side filling process, places and removes a front doored cage with the doors to the same side, but the manner of staging of the cages is unsuitable for front filling, because it requires a forklift to approach the staging platform from the side for offloading a filled cage while one is placed in filling position, thus the staging platform would have to be at least twice as wide as the cage length. Since these cages typically run 8 feet long, the platform would be at least 16 feet wide, too wide for towing over public highways and too wide for a working trailer in many chicken houses. U.S. Pat. No. 5,476,353 to Mola and U.S. Pat. No. 5,791,854 to Cattaruzzi are based on a carousel concept.

In general, forklift maneuverability for side access to a staging platform is limited in chicken houses; most permit only forklift access longitudinally in the house, and since the catching and caging operations longitudinally precede the cage deposit and retrieval operations in the chicken house, forklift access is usually constrained to an approach from the rear, not the side.

Among the purposes of this invention is to provide a working platform, preferably a towable working trailer, useful in connection with mechanized poultry catching and front loading equipment that will allow front opening steel poultry cages to be deposited onto the rear of the working trailer with the doors facing one side of the trailer, will reposition the cage to the front of the trailer for front loading, and will return the loaded cage to the rear for offloading with the doors oriented in the same direction as when originally placed on the working conveyor. Further a purpose is to obtain the forgoing, while simultaneously allowing deposit of an empty cage as one cage is filling, with positioning of that empty cage for filling while the filled cage is repositioned for offloading. Still further, it is an objective to accomplish all this yet still permit the working trailer to be trailered over public roads and towed in chicken houses.

These and other benefits are given by the present invention.

SUMMARY OF THE INVENTION

This invention comprises methods and structure for continuously receiving, batching, and loading poultry into front-doored, multi-compartmented, multi-tiered poultry cages that are serially and continuously staged for loading. The invention includes individual major components and combinations of the major components in cooperating systems. The components comprise a novel poultry batcher and loader and a novel cage stager. The poultry batcher receives poultry in a plurality of bins oriented side by side, and the poultry loader reciprocates in front of the bins to receive poultry batches from the bins and discharge the poultry batches at high loading speed into compartments of the poultry cage. The stager moves empty cages into position for receipt of the poultry, employing novel staging platforms which receive empty cages with their doors facing in one direction (say, to the right as the platform is viewed from the rear), and after the cages are loaded with the poultry, moves the cages to another position on the platform for removal with the doors still oriented in the original direction (to the right, in this example). This facilitates efficiency in fetching empty cages from a trailer for loading with poultry and picking up loaded cages for placement on a trailer for transport to a processing plant.

In general, the method for loading poultry in accordance with the invention comprises (a) removing poultry from one of a plurality of bins arranged side by side for receiving poultry while not removing poultry from the others of the bins, (b) directly receiving the removed poultry on a belt conveyor and discharging the removed poultry at high loading speed into an open doorway of a compartment of a transversely facing front-doored multi-compartmented poultry cage, followed by repeating operations (a) and (b) sequentially with respect to the others of the bins.

In our invention, birds are not merely passed individually from one conveyor to another that in turn feeds the birds more or less serially into a compartment of a poultry cage. Instead, in our invention, the birds are formed into separate batches in a plurality of receiver bins, a conveyor belt is moved in front of one of the batches, the batch is moved onto the loader conveyor, and the loader conveyor, simultaneously moving at high loading speed, propels the entire batch essentially as a group into the cage compartment.

High loading speed is important in realizing the full advantages of the batching and loading method and apparatus of the invention. As explained in the "Background of the Invention", when birds are manually placed through a doorway into a cage compartment, they ordinarily immediately try to resist going towards the back of the compartment and seek to escape out the doorway. If a train of birds is being attempted loaded by a conveyor belt into the compartment at less than a high loading speed, the lead birds of the train aren't propelled all the way to the back of the compartment and seek their escape going counter flow to birds entering the compartment behind them in the train coming off the conveyor. This tends to impede the flow of the birds trailing them into the compartment, clustering or bunching incoming birds toward the front portion of the compartment, slowing completion of delivery of the last of the birds in the train into the compartment and sometimes allowing some of the birds to escape. If the birds aren't loaded fast enough, the loader becomes a choke point to the catching and loading process, slowing the entire process of catching and caging birds.

We have discovered that, for a loading conveyor in loading alignment with the portal of a cage compartment, birds are efficiently loaded into a cage compartment in a manner alleviating bird bunching at the front portion of the compartment if the loading conveyor is operated at a speed sufficiently fast to propel the lead birds in a batch of birds all the way to the back of the compartment (with the remainder of the birds in the batch loaded right behind the lead bird just as fast as the lead birds). As used in this description, we therefore use the term "high loading speed" to mean a speed sufficient to propel lead birds in a batch of birds all the way to the back of a cage compartment.

We have found that a loader belt speed of about 100 feet per minute per pound of bird is about the minimum high loading speed that is effective for efficiently loading broiler weight chickens, in most instances, if the cage is tilted up with compartment floors down sloping (as is typical for manual loading). The expression "per pound of bird" or "per pound of poultry" refers to an average weight of birds being loaded. Preferably the high loading speed is more in the vicinity of about 150–200 feet per minute per pound of bird. Thus, for a nominal broiler weight chicken in the range of about five to about seven pounds, loader belt speed should be at least about 500 feet per minute up to at least about 1050 feet per minute up to about 1400 feet per minute. We have found that a belt speed of about 800 to 900 feet per minute, suitably about 850 feet per minute, is generally acceptable as a default or starting point for a high loading speed for the usual broiler weight bird, subject to adjustment as necessary in the particular situation. If the cage is not tilted up as is conventional, higher loader belt speeds may be appropriate because the birds seeking escape do not have gravity to overcome as they do with a down sloping floor. If the birds are wet, higher speeds may be needed more than if the birds are dry.

The lower limits of the "high loading speed" of the loader conveyor belt is a speed sufficient to propel the batch of birds into a cage compartment as a bunched mass or group substantially all at once, on their feet, standing, crouching or squatting, propelling the lead bird all the way to the back of the compartment. The upper limit of "high loading speed" is a loading conveyor belt floor speed beyond which the speed is so fast, relative to the speed of the birds when they are received on the loading belt conveyor, that the birds aren't able to stay upright, that is, the speed of the loading belt conveyor floor topples the birds off their feet and puts them on their side or back. On their back or side, the lead birds deposited at the back of the compartment, especially if the cage is tilted up for loading, aren't able to push off birds that follow on top of them in mass and so aren't able right themselves. Unrighted, the lead birds may smother under the mass of birds on top of them in the time it takes to load the entire cage if the cage is tilted up for loading. Inevitably, some birds will loose their feet even at minimum high loading speeds. When we speak of birds being propelled into the compartment on their feet, we mean on the whole the speed is not so fast as consistently to topple the birds in large proportions. Some losses due to toppling will be acceptable as a cost of faster loading efficiencies.

If the birds are accelerated immediately from standstill to a high loading speed, the birds may be toppled off their feet, depending on the weight of the birds, the speed of the loading belt, slickness of the surface of the conveyor belt (they get dirty in use and sometimes wet) and perhaps other variables. At the lowest limits of a high loading speed it may be possible for the receiving bin conveyor belt floor and the loading conveyor belt floor to operate at substantially the same speeds without toppling the birds, and the invention encompasses that possibility, so long as the loading conveyor belt speed is effective to propel the leading birds in the bunch all the way to the back of the compartment of a cage. However, we prefer to accelerate the birds from standstill to high loading speed in two steps, first from standstill at a receiving bin conveyor belt floor speed slower than minimum high loading speeds and sufficient such that when the birds transfer onto the loading conveyor belt floor that is moving at least at the minimum high loading speed, preferably higher, the incremental leap in acceleration is insufficient to topple the birds, even as the loading belt speed exceeds 1000 feet per minute or more for broiler weight chickens. That is, by incrementally moving the batched birds from standstill to high loading speed in stepped speeds, on being moved onto the faster loading conveyor belt, the birds aren't toppled off their feet, as they are move likely to have happen if they are accelerated all at once from standstill to a high loading speed. For example, receiver bin conveyor belt floor speeds of suitably about 200–450 feet per second for broiler weight chickens, for example about 350 feet per minute for a loader belt speed of 850 to 900 feet per minute, suitably bring the birds to a speed for transfer onto the loading conveyor belt such that the loader belt speeds can range to in excess of 1000 feet per minute without toppling the birds.

More particularly describing the methodology of loading the birds, the method comprises the operations of (a) receiving poultry in a plurality of bins, each bin having an independently operable conveyor belt floor having a poultry receiving end and a poultry discharging end, the bins being arranged side by side such that their conveyor belts are substantially parallel, (b) moving transversely, to the direction of the conveyor belts of the bins, a poultry loading conveyor belt floor arranged in the same direction as the belts of the bins, the poultry loading conveyor belt floor having a poultry discharging end, and positioning the poultry loading conveyor belt floor in alignment with the conveyor belt floor of a the bin containing poultry, (c) rotating the bin conveyor belt, with which the poultry loading conveyor belt is aligned, in the direction of the discharge end of such bin conveyor belt while maintaining stationary the conveyor belts of the other of the bins, to selectively discharge the poultry in such bin with which the poultry loading conveyor belt is aligned, (d) receiving the discharged poultry on the poultry loader conveyor belt floor that is in alignment with the bin from which the poultry are discharged, and (e) rotating the loader conveyor belt in the direction of the discharge end of such loader conveyor belt at a high loading speed to discharge the poultry received on the poultry loader conveyor. Then, (f) after the poultry are discharged in operation "(e)" into the compartment, repeating operations "(b)"–"(d)" with respect to another of the bins containing poultry, and (g) rotating the loader conveyor belt at high loading speed to discharge the poultry received on the poultry loader conveyor belt floor into a compartment of the cage different from the facing compartment loaded in operation (e), through a door opening of the different compartment. Operations (f)–(g) are repeated until all cage compartments in a tier of the cage are loaded with poultry.

The standard poultry cage is multi-tiered, so in this respect the methodology further comprises (h) adjusting the elevation of the bins and the poultry loading conveyor belt to match the elevation of a tier of the cage containing one or more empty compartments, and (i) repeating operations (a)–(e) and if necessary also operations (f) and (g) until all empty cage compartments in such empty compartment tier are loaded with poultry.

The loading process also includes metering the birds so that a selected amount of birds (a "batch") are loaded into the compartments of a cage. As mentioned above, a three door cage holds about 20 five pound chickens per cage or about 100 pounds. In a more complete picture of the methodology for loading poultry, it includes, in addition to operations (a)–(g) described above for a single tier of a poultry cage, the further operations of (j) lifting poultry from the floor of a chicken house and placing the lifted poultry into one of the bins while determining the amount of poultry placed into such bin, (k) ceasing placement of poultry into such bin when a predetermined amount of poultry is placed in such bin, and (l) repeating operations (j) and (k) for any empty bins among the plurality of bins.

Before the poultry can be loaded into the cages, the poultry must be received for batching, and before they are received for batching, they must be picked up off the poultry house floor and lifted to distribute them to batching receivers. Thus, viewed in the broader context of "catching" the poultry to be loaded, the catching and loading methodology can be capsulized as (a) collecting and lifting poultry from the floor of a poultry house, (b) placing the lifted poultry into a plurality of bins, (c) removing poultry in one of the bins while not removing poultry from the others of the bins, (d) receiving the removed poultry directly from the removing means and discharging the removed poultry at a high loading speed into a compartment of a transversely facing opened-door front-doored compartment of a multi-compartmented poultry cage, and (e) repeating operations (c) and (d) sequentially with respect to the others of the bins.

Broiler weight chickens in a growing house will run a spread of weights, and distribution of amounts of birds (by weight or count) into receiving bins will be only approximate even from bin to bin. Bird catching mechanism efficiency and operator proficiency not only at the bird catching end but also at the end distributing birds into the receiving bins will affect the amount of birds per unit time reaching the receiving bins. The many variables involved do not admit of one set of lift and receiver belt speeds. In practice, we have observed, that for a high loading speed of about 800 to 900 feet per minute for broiler weight chickens, a receiver belt speed of about 300 to 400 feet per minute adequately matches up with a lift conveyor speed of about 200–300 feet per minute and a distributor conveyor speed of about 200–300 feet per second.

This invention provides means for accomplishing the functions described above that are part of the methodology of this invention for catching, lifting, batching and loading poultry into front-doored, multi-compartment poultry cages.

Embodying this methodology in a poultry batcher and loader of this invention is (a) a plurality of longitudinal bins arranged side by side for receiving poultry, (b) means for each of the bins for longitudinally removing poultry from one of the bins while not removing poultry from the others of the bins, and (c) means transversely alignable with any of the poultry removal means for the bins for directly longitudinally receiving removed poultry from one of the removing means and longitudinally discharging the removed poultry at a high loading speed into a compartment of a transversely facing open-doored front-doored compartment of a multi-compartmented poultry cage.

In the broader system view, the poultry loader apparatus of the invention integrates with catching apparatus to comprise, in capsule: (a) means for collecting and lifting poultry from the floor of a poultry house, (b) means for placing the lifted poultry into a plurality of bins arranged side by side, (c) means for each of the bins for removing poultry from one of the bins while not removing poultry from the others of the bins, and (d) means transversely alignable with any of the poultry removal means for the bins for directly receiving removed poultry from one of the removing means and discharging the removed poultry at a high loading speed into a compartment of a transversely facing open-doored front-doored compartment of a multi-compartmented poultry cage.

Structure embodying the poultry batcher and loader of this invention for batching and loading poultry into the front door openings of a front-doored, multi-compartmented cage includes a support and a plurality of poultry receiving bins carried by the support. Each bin has a longitudinally arranged, independently operable, conveyor belt floor having a poultry receiving end and poultry discharging end. The bins are arranged side by side such that their conveyor belts are substantially parallel. Poultry receiving bin conveyor belt drivers drive each of the poultry receiving bin conveyor belts independently and intermittently. A poultry loader for distributing poultry from the bins comprises a longitudinally arranged conveyor belt floor with a poultry discharging end. A carriage supports the loader conveyor belt longitudinally to the bin conveyor belts. The carriage, which is mounted on the aforementioned support, is moveable transversely to the longitudinal direction of the conveyor belts of the poultry receiving bins so that the loader conveyor belt can be placed in longitudinally alignment with the individual conveyor belts of the poultry receiving bins that contain poultry. A poultry loader conveyor driver drives the poultry loading conveyor belt at high loading speed.

A bird weight measurer is operatively associated with the poultry receiving bin conveyor belts or structure immediately supporting the belts for measuring the weight of poultry received in one or more of the bins on the belts. A reporter reports the weight measured by the weight measurer. An operator employs the report to determine when a predetermined amount of chickens have been loaded into a receiving bin. When the operator perceives from the reporter that a predetermined amount of poultry has been received in a receiving bin, the operator redirects the flow of birds lifted from the floor of the poultry house to a bin among the other of the bins that is empty of birds. While that empty bin is receiving lifted birds, the poultry loader is moved to one of the filled receiving bins.

Preferably but not necessarily an electrical contact alignment switch for each poultry receiving bin is contacted and closed when the loader conveyor belt of the poultry batcher is center aligned with the conveyor belt of that bin, to enable manual operation of an operator controlled switch for the drivers for both the conveyor belt floor of that receiving bin and the aligned loader conveyor belt. The driver for the receiving bin belt conveyor operates that conveyor at a speed preferably less than the minimum high loading speed, and the driver for the loading belt conveyor operates that conveyor at a speed at a high loading speed, all as described hereinabove. Use of the enabling alignment switch prevents the operator from powering on the receiving bin and loading conveyor belts when the loading conveyor is not totally aligned with the receiving bin. In lieu of the electric contact alignment switch, an optics system comprising a light source, for example a laser pen or diode and a receptor responsive to the wavelength band of the source and coupled with a switch may be used as a sighting or alignment system. An electrical contact alignment switch is preferable because the operating environment is dirty, and dirt may impair operation of an optical system. In either instance, the belt drivers enabling switch (contact or optical) provides the benefit of avoiding accidental discharge of birds.

The "alignment switch" is helpful where there are three or more receiving bins: two outside and at least one inside bin. If the switch were to switch on the belt drivers directly, as opposed to enabling their manual operation, then when the loading conveyor is moved from an alignment with an outside receiver bin to alignment with the other outside bin, to fill an empty cage compartment longitudinally aligned with the other outside bin (as for example, where cage compartment aligned with the inside bin is already filled with poultry and the both the inside receiving bin and the other outside receiving bin are filled), then when the loading conveyor is moved across the inside bin, the switch would directly engage the drivers for both the inside bin belt and the loader belt and empty the inside bin, and the loader belt would spew poultry toward an already filled compartment (whose cage door will normally have already been closed) with ricochet of birds everywhere.

Of course where a two door cage is being loaded, a direct engagement switch may be of benefit.

The poultry batcher and loader of the invention is vertically moveable in order to load all tiers of a multi-tiered, multi-compartmented poultry cage. For loading a cage that is tilted up to provide down sloping compartment floors, the batcher/loader raising and lowering apparatus is designed to maintain a uniform distance, as the loader moves up and down, between the discharge end of the loader conveyor and the edges of the opened cage doors that vertically recede with each higher tier of a tilted up cage. The structure providing this function for the poultry batcher and loader includes a fixed first or lower support base that has a rear end and a front end and is inclined from the rear end to the front end at a minor acute angle from horizontal that is selected to match the angle at which the cage will be tilted up (or equivalently, is set at a minor acute angle that the elevator, described below, with be set to tilt up the cage to match). A moveable second or upper support base mounts the poultry receiving bins and the poultry loader. A lift assembly is connected to the lower and upper support bases for lifting or lowering the upper support base relative to the lower support base such that the angle of the upper support base is maintained at the angle of the lower support base throughout the course of lifting or lowering. An hydraulically powered scissors lift efficiently provides this function. Other means suitable for lifting the upper support base at the angle of the lower support base throughout the course of lifting or lowering include a cable/chain pulley system or a piston powered straight lift with staggered piston rod heights.

It is to be understood that while the preferred mode is having the poultry batching and loading apparatus inclined to match the angle of the tilted cage, the cage is not required to be angled, and in that case, of course, the lift structure for the batching and loading apparatus will elevate the batching and loading apparatus straight up and down so that the discharge end of the loading conveyor belt is maintained at a substantially constant distant from the ends of the lowered doors of the un-tilted cage. The loading arrangement of this invention sufficiently propels the birds into the cage compartments that cage tilting is not necessary for operation; however, cage tilting allows a lower high loading speed. Thus in total scope, the invention includes means for lifting the upper support relative to the lower support to maintain the distance relationship between the edges of the cage doors and the discharge end of the loading conveyor, regardless of whether the cage is tilted or not.

As mentioned above, an important component of the system is a novel stager for staging front-doored multi-compartment cages having fork tubes along length of the cage, for frontal filling of the cages. In broad terms, a stager in accordance with this invention comprises a platform having a front, a rear, two sides each longer than the rear and a centerline. The centerline is an imaginary line running from the platform front to rear and marking the center between the sides of the platform. It does not require, but does not prevent, structure from being located there. There is a place of origin at a first rear portion of the platform to one side of the centerline, for receipt of a cage placed with the cage fork tubes longitudinal to the sides of the platform and the cage doors facing a selected first direction towards or away from the centerline. There is a place of destination at a second rear portion of the stager on the other side of the centerline, and there is a place of cage filling at the front of the platform between the sides. The stager includes means for moving an empty cage put on the platform from the place of origin finally to the place of destination with the doors of the cage remaining facing the same selected direction upon final arrival of the cage at the place of destination.

Thus viewing the stager from the rear at the centerline, if the place of origin is to the left of the centerline (putting the place of destination on the right of the centerline) and if a cage is deposited at the place of origin with the cage doors facing the centerline, then the cage doors would face to the right. In accordance with the present invention, when the cage arrives loaded at the place of destination, the cage doors will still face the right, away from the centerline. The reverse applies too. If the place of origin is to the right of the centerline and the place of destination is to the left of the centerline, and if the cage doors at the place of origin face the centerline, the doors (viewed from the rear of the stager) will be on the left of the viewer when the empty cage is deposited on the place of origin, and will be on the left of the viewer when the loaded cage arrives at the place of destination. Alternatively, with the place of origin to the left of the centerline, a cage deposited there with the cage doors facing away from the centerline (to the viewer's left) will arrive loaded in accordance with this invention at the place of destination with the cage doors facing the centerline (to the viewer's left). The viewer is, of course, the driver of the fork lift who places the cages on the place of origin and who removes the cages from the place of destination.

Thus, the stager of this invention, in its several forms, always returns loaded cages for removal with the doors facing in the same direction with respect to the driver as the doors faced when the driver deposited the cage on the stager at the place of origin. This reduces the number of operations the driver has to accomplish. The driver does not have to pick up a filled cage and take it to a location to set it down and drive to the other side of the cage and pick it up again and then drive to the trailer to load the filled cage on the trailer in the proper orientation. The driver needs only to fetch an empty cage from a trailer and return the filled cage to the trailer facing the same direction as the empty cage. This allows the driver to load the filled cage faster and so fetch another empty cage quicker for return to the stager and placement at the place of origin.

Between empty cage departure on the stager from the place of origin and final cage arrival loaded at the place of destination, means rotate the cage in substantially discrete two quarter turns such that at the place of filling, the cage doors face the front of the platform and after leaving the place of filling and upon reaching the place of destination, the cage doors face the original selected direction (the direction they faced when deposited at the place of origin.

Thus a staging methodology for staging front-doored multi-compartment cages having fork tubes along length of the cage, for frontal filling of the cages, comprises—on a platform having a front, a rear, two sides each longer than the rear, a centerline, a place of origin at a first rear portion of the stager to one side of the centerline, a place of destination at a second rear portion of the stager on the other side of the centerline, and a place of cage filling at a front portion of the platform between the sides—the operations of placing an empty cage at the place of origin with the cage fork tubes longitudinal to the sides of the platform and the cage doors facing a selected direction toward or away from the centerline, moving the cage on the platform from the place of origin finally to the place of destination with the doors of the cage remaining facing the same selected direction upon arrival of the cage at the place of destination, and between departure from the place of origin and arrival at the place of destination, rotating the first cage in substantially two quarter turn increments such that at the place of filling, the cage doors face the front of the platform, and after leaving the place of filling and before reaching the place of destination, the cage doors of the filled cage face the selected direction.

In one embodiment of the staging invention, for example, the staging method is one in which the selected direction of the cage doors is facing away from the centerline. The cage is first moved directly from the place of origin to the place of destination, thence to the place of filling, and thence back to the place of destination, rotating the cage in the first quarter turn between the place of destination and the place of filling, and rotating the cage in the second quarter turn between the place of filling and the place of destination.

In this embodiment, therefore, the method comprises—on a platform having a front, a rear, two sides each longer than the rear, a centerline, a place of origin at a first rear portion of the stager to one side of the centerline, a place of destination at a second rear portion of the stager on the other side of the centerline, and a place of cage filling at a front portion of the platform between the sides—placing the cage at the place of origin with the cage fork tubes longitudinal to the sides of the platform and the cage doors facing away from the centerline; thence moving the cage on the platform from the place of origin to the place of destination and thence to the place of filling, rotating the cage substantially a quarter turn after leaving the place of destination and by the time of arrival at the place of filling, such that at the place of filling, the cage doors face the front of the platform. After that the cage is moved on the platform from the place of filling to the place of destination, and the cage is rotated substantially a quarter turn such that on arrival at the place of destination, the cage doors face the same selected direction as when the cage was placed at the place of origin.

The foregoing sequence of operations applies whether the place of origin is on the right or left of the centerline (from the viewpoint of the fork lift driver).

Another more preferred embodiment of the staging invention has the advantage of less cage movement on the platform. This allows more cages to be placed, filled and removed from the platform in a unit of time. This staging method is one in which the selected direction of the cage doors of the empty cage is facing towards the centerline. The cage is moved directly from the place of origin to the place of filling, thence to the place of destination, rotating the cage a first quarter turn between the place of origin and the place of filling, and rotating the cage for a second quarter turn between the place of filling and the place of destination.

In this latter embodiment, therefore, the method comprises—on a platform having a front, a rear, two sides each longer than the rear, a centerline, a place of origin at a first rear portion of the stager to one side of the centerline, a place of destination at a second rear portion of the stager on the other side of the centerline, and a place of cage filling at a front portion of the platform between the sides—placing a first the cage at the place of origin with the cage fork tubes longitudinal to the sides of the platform and the cage doors facing towards the centerline; thence moving the first cage on the platform from the place of origin to the place of filling, rotating the cage substantially a quarter turn such that at the place of filling, the cage doors face the front of the platform; and thence moving the first cage on the platform from the place of filling to the place of destination, rotating the cage substantially a quarter turn such that on arrival at the place of destination, the cage doors face the same direction as when the cage was placed at the place of origin.

The foregoing sequence of operations applies whether or not the place of origin is on the left or right of the centerline (from the viewpoint of the fork lift driver)

More particularly describing the latter more preferred embodiment in the form of a unitary platform in accordance with the invention for staging a front-doored compartment multi-compartmented poultry cage having fork tubes extending along the front and back of the cage at the base of the cage transverse to the direction of front door opening, the platform comprises a frame having (an imaginary) longitudinal centerline and longitudinally connected front and rear ends. The frame mounts transversely to the longitudinal centerline at least two wheel axles carrying wheels supporting the frame above ground level. A supporting surface is mounted on the frame. A tray is horizontally pivotally mounted to one side of the frame centerline in a front portion of the frame and is supported on the aforementioned supporting surface. The tray has a front end and a rear end and opposing sides and is pivotable, from a home position in which the sides of the tray are transverse to the frame centerline, to an away position in which the sides of the tray are substantially parallel with the frame centerline. The sides of the tray are an "in" side and an "out" side. The former is the side closer to the frame centerline than the latter side when the tray is in the away position.

Continuing with the description of this unitary platform embodiment, a first cage mover is supported by the frame in a rear portion of the frame on the same side of the centerline where the tray is in the away position. The first cage mover has a first engager for engaging a poultry cage placed on the rear portion with the cage fork tubes longitudinally aligned substantially parallel to the longitudinal centerline of the frame and the cage doors facing the centerline. The first cage mover also has a first force transmission drive for moving the engaged cage so aligned toward the front end of the frame and onto the tray in the away position. A pivot member is provided on the platform adjacent the frame centerline between the front and rear ends of such frame. A second cage mover is provided on the frame on the side of the centerline opposite the first cage mover. The second cage mover has a second engager for engaging the cage on the tray when the tray is in the home position, and has a second force transmission drive carrying the second engager for moving the engaged cage towards a rear portion of the frame on the opposite side of the centerline, in so doing turning the front end of the tray towards the away position and pivoting the back of the cage on the pivot member to align the cage with its fork tubes substantially parallel to the longitudinal centerline of the frame when the cage is at the rear portion of the frame on the opposite side, and with the cage doors facing away from the centerline.

This unitary platform embodiment of a cage stager may also and preferably but not necessarily will include an elevator attached to the frame adjacent the front end of the frame and elevatable above the support surface for tilting up the poultry cage to ready it for loading. The cages are normally tilted up rear to front at a minor acute angle. This will be an angle that is effective to make it more difficult for birds to escape from a compartment during loading (as has been conventional with manual loading) but not so steep as to risk the cage from falling backwards as birds are loaded in it and weight the cage to the rear of the cage. An angle in the range from about 11 to about 16 degrees to the horizontal is generally suitable for this purpose, although a lesser or greater angle may be used within the constraints of risking fall over. The elevator provides an elevation in this range that matches the slope of the base support of the cage loader so that uniform distance is provided between the discharge end of the cage loader and the receding edges of the doors at successively higher tiers of the cage, as explained above. The "in-side" of the platform tray has an opening or recess through which the elevator can elevate above the tray when the tray is in the home position. The "out-side" of the tray comprises an flange angled to substantially the same angle from horizontal as the cage is to be tilted up. This flange member provides a backstop to fix the back base of the cage on the tray and prevent it from sliding or skidding off the tray toward to the rear of the platform when the elevator tilts up the front of the cage to ready it for loading.

For over-the-road transport of the preferred stager mode (in which the cage doors of empty cages are placed on the stager facing in the direction of the stager centerline), it is preferred for reasons of convenience in compactly trailering the stager to the poultry house farm to employ a stager comprised of two parts combinable at the farm site. The two parts are a leading chassis and a trailing chassis.

The leading chassis comprises a leading chassis frame having a longitudinal centerline and longitudinally connected front and rear ends. The leading chassis frame mounts transversely to the longitudinal centerline at least one wheel axle carrying wheels supporting the leading chassis frame above ground level. Aligning and connecting members are provided at the rear of the leading chassis frame for aligning and connecting the leading chassis to a trailing chassis. A rear platform is on the leading chassis frame rear. A tray is horizontally pivotally mounted and supported on the rear platform on one side of centerline. The tray has a front end and a rear end and has opposing sides and is pivotable from a home position in which the sides of the tray are transverse to the longitudinal centerline of the leading chassis frame, to an away position in which the sides of the tray are substantially parallel to the longitudinal centerline of the leading chassis frame.

The trailing chassis includes a trailing chassis frame having a longitudinal centerline and longitudinally connected front and rear ends. The front end has mating members for the aligning and connecting members for connecting the trailing chassis in longitudinal alignment with the leading chassis. The trailing chassis frame transversely mounts at least one axle for carrying wheels, the wheels supporting the trailing chassis frame above ground level substantially at the same elevation as the level of the leading chassis. A supporting surface is mounted on the trailing chassis frame. A first cage mover is supported by the trailing chassis frame in a rear portion of the trailing chassis on the same side of the trailing chassis centerline where the tray on the leading chassis is in the away position. The first cage mover has a first engager for engaging a poultry cage placed on the rear portion of the trailing chassis with the cage fork tubes longitudinally aligned substantially parallel to the trailing chassis centerline and the cage doors facing the centerline. A first force transmission movement carries the first engager for moving the engaged cage so aligned toward the front end of the trailing chassis and off the trailing chassis onto the tray in the away position on the leading chassis. A pivot member is located adjacent the trailing chassis centerline between the front and rear ends of the trailing chassis frame. A second cage mover is on the trailing chassis on the side of the trailing chassis centerline opposite the first cage mover. The second cage mover has a second cage engager for engaging the cage on the tray on the leading chassis frame when the tray is in the home position, and has a second force transmission movement carrying the second engager for moving the engaged cage towards a rear portion of the trailing chassis frame on the opposite side of the centerline, in so doing turning the front of the tray towards the away position and pivoting the back of the cage on the pivot member to align the cage with its fork tubes substantially parallel to the longitudinal centerline of the trailing chassis when the cage is at the rear portion of the trailing chassis frame on the opposite side, and with the doors facing away from the centerline.

This more conveniently transportable two chassis embodiment also may and preferably does have an elevator attached to the leading chassis frame adjacent the front end of such frame and elevatable above the rear platform, in the same manner and for the same purpose as in the unitary platform embodiment. And as in the unitary platform embodiment, the in-side of the tray (on the leading chassis) has an opening through which the elevator can elevate above the tray when the tray is in the home position, the out-side comprising an upstanding retainer member to provide the brace for the back base of the cage when it is tilted up.

Thus, a method is more particularly provided for staging a front-doored compartment multi-compartmented poultry cage having fork tubes extending along the front and back of the cage at the base of the cage transverse to the direction of front door opening. The method comprises (a) placing a first the cage on one side of a longitudinal frame centerline in a rear portion of a support surface fixed on a frame having longitudinally connected front and rear ends, with the cage fork tubes longitudinally aligned substantially parallel to the longitudinal centerline of the frame and the cage doors facing the centerline, (b) engaging the first cage placed on the rear portion and moving the engaged cage so aligned toward the front end of the frame and onto a tray in an away position of the tray, the tray being horizontally pivotally mounted on the same the one side of the centerline in a front portion of the frame and supported on the surface, the tray having a front end and a rear end and opposing sides and being pivotable from a home position in which the sides of the tray are transverse to the frame centerline, to the away position in which the sides of the tray are substantially parallel with the frame centerline, (c) moving the tray to the home position where the cage doors face the front of the frame, (d) engaging the first cage on the tray in the home position and moving the engaged cage in the direction of the rear of the frame on the opposite side of the centerline from the one side, in so doing turning the front of the tray towards the away position and pivoting the back of the cage on the pivot member to align the cage with its fork tubes substantially parallel to the longitudinal centerline of the frame when the cage is at the rear portion of the frame on the opposite side, and with the doors facing away from the centerline, and (e) removing the first cage from the support surface.

This method further comprising, after operation (b) with respect to the first cage, placing a second the cage on the one side of the longitudinal frame centerline in the rear portion, with the second cage fork tubes longitudinally aligned substantially parallel to the longitudinal centerline of the frame and the doors of the second cage facing the centerline, and after commencing operation (d) with respect to the first cage, performing operations (b)–(d) on the second cage.

As is seen from the foregoing, there is provided, in accordance with this invention, a system for loading poultry into a series of front-doored multi-compartmented poultry cages. The system comprises (a) a plurality of poultry receiving bins arranged side by side, (b) means structurally associated with the bins for longitudinally removing poultry in one of the bins while not removing poultry from the others of the bins, (c) means longitudinally arranged relative to the removing means for receiving the removed poultry directly from the removing means and longitudinally discharging the removed poultry at a high loading speed into an open compartment of a transversely facing front-doored compartment of the poultry cage, and (d) means for staging a series of empty the poultry cages on a platform having a front end and a longitudinal centerline, such that the cage doors face in a selected direction towards or away from the centerline when an empty cage is on a rear portion of the platform on one side of the centerline, face the front end of the platform transversely to the centerline at a front portion of the platform for loading with poultry, and face in the same selected direction towards or away from the centerline at a rear portion of the platform on a side of the centerline opposite from the one side for removal of a loaded cage from the platform.

The system for loading poultry in a series of front-doored multi-compartmented poultry cages is based on a method of the invention that comprises (a) placing a first of a series of empty the poultry cages on a platform having a front end and a longitudinal centerline, initially such that the cage is on one side of the centerline with the cage doors facing the centerline, then (b) moving the cage to a front portion of the platform transversely to the centerline with the doors facing the front of the platform, (c) longitudinally delivering poultry at a high loading speed directly and serially into open compartments of the transversely front door facing poultry cage, (d) after the cage is loaded with poultry, moving the loaded cage on the platform to the opposite side of the centerline from where the empty cage was initially placed so that the doors of the cage face away from the centerline, (e) removing the first cage from the platform, (f) at anytime after operation "(b)", placing a second of the series of empty poultry cages on the platform, such that the second cage is on the one side of the centerline with the cage doors facing the centerline, and then (g) repeating steps "(b)"–"(e)" with respect to the second cage.

More particularly, the method using this system comprises (a) placing a first cage on one side of a longitudinal frame centerline in a rear portion of a support surface fixed on a frame having longitudinally connected front and rear ends, with the cage fork tubes longitudinally aligned substantially parallel to the longitudinal centerline of the frame and the cage doors facing the centerline; (b) engaging the first cage placed on the rear portion and moving the engaged cage so aligned toward the front end of the frame and onto a tray in an away position of the tray, the tray being horizontally pivotally mounted on the same the one side of the centerline in a front portion of the frame and supported on the surface, the tray having a front end and a rear end and opposing sides and being pivotable from a home position in which the sides of the tray are transverse to the frame centerline, to the away position in which the sides of the tray are substantially parallel with the frame centerline; (c) moving the tray to the home position where the cage doors face the front of the frame; (d) without regard to operations "(a)"–"(c)", (d)(1) receiving poultry in a plurality of bins, each bin having a longitudinal independently operable conveyor belt floor having a poultry receiving end and a poultry discharging end, the bins being arranged side by side such that their conveyor belts are substantially parallel, (d)(2) moving transversely to the longitudinal direction of the conveyor belts of the bins a poultry loading conveyor belt floor longitudinally arranged in the same the direction, the poultry loading conveyor belt floor having a poultry discharging end, and positioning the poultry loading conveyor belt floor in longitudinal alignment with the conveyor belt floor of a the bin containing poultry, (d)(3) rotating the bin conveyor belt, with which the poultry loading conveyor belt is longitudinally aligned, in the direction of the discharge end of such bin conveyor belt while maintaining stationary the conveyor belts of the other of the bins, to selectively discharge the poultry in such bin with which the poultry loading conveyor belt is longitudinally aligned, (d)(4) receiving the discharged poultry on the poultry loader conveyor belt floor that is in longitudinal alignment with the bin from which the poultry are discharged; (e) with operations "(a)"–"(c)" and "(d)(1)"–"(d)(4)" completed and with the door of a cage compartment facing the discharge end of the loading conveyor opened, rotating the loader conveyor belt in the direction of the discharge end of such loader conveyor belt to discharge the poultry received on the poultry loader conveyor belt floor into the facing compartment of the first cage, (f) closing the door of the facing compartment; (g) after the poultry are discharged in operation "(e)" into the compartment, moving the poultry loading conveyor belt floor transversely to the longitudinal direction of the conveyor belts of the bins and positioning the poultry loading conveyor belt floor in longitudinal alignment with the conveyor belt floor of another of the bin containing poultry, and repeating operations "(d)(3)"–"(d)(4)" and operation "(e)" with respect to the another bin containing poultry; (h) repeating operation "(g)" until all compartments in a tier are loaded with poultry; (i) adjusting the elevation of the bins and the poultry loading conveyor belt to match the elevation of a tier of the cage containing one or more empty compartments; (j) repeating operations "(a)"–"(f)" and if necessary also operations "(g)" and "(h)" until all empty cage compartments in such empty compartment tier are loaded with poultry; (k) after completion of operation "(j)", repeating operations "(i)" and "(j)" until all tiers of the cage are loaded with poultry; (l) with the first cage loaded with poultry, engaging the first cage on the tray in the home position and moving the engaged cage in the direction of the rear of the frame on the opposite side of the centerline from the one side, in so doing turning the front of the tray towards the away position and pivoting the back of the cage on the pivot member to align the cage with its fork tubes substantially parallel to the longitudinal centerline of the frame when the cage is at the rear portion of the frame on the opposite side, and with the doors facing away from the centerline; (m) removing the first cage from the support surface; and (n) after operation "(b)" with respect to the first cage, placing a second cage on the one side of the longitudinal frame centerline in the rear portion, with the second cage fork tubes longitudinally aligned substantially parallel to the longitudinal centerline of the frame and the doors of the second cage facing the centerline, and after commencing operation "(l)" with respect to the first cage, performing operations "(b)"–"(m)" on the second cage.

A different method applies where the stager is placed on a platform facing away from the centerline. In that case, the method of loading poultry in a series of front-doored multi-compartmented poultry cages, comprises (a) placing a first of a series of empty the poultry cages on a platform having a front end and a longitudinal centerline, initially such that the cage is on one side of the centerline with the cage doors facing away from the centerline; thence (b) moving the cage on the platform to the opposite side of the centerline from where the empty cage was initially placed so that the doors of the cage face away from the centerline; thence (c) moving the cage to a front portion of the platform rotating the cage a quarter turn such that the cage is transverse to the centerline and the doors face the front of the platform; (d) longitudinally delivering poultry at high loading speed directly and serially into open compartments of the facing poultry cage; (e) after the cage is loaded with poultry, moving the loaded cage on the platform to the opposite side of the centerline rotating the cage a quarter turn such that the doors of the cage face towards the centerline; (f) removing the first cage from the platform; (g) at anytime after operation "(b)", placing a second of the series of empty poultry cages on the platform, such that the second cage is on the one side of the centerline with the cage doors facing the away from the centerline; and then (h) repeating steps "(b)"–"(e)" with respect to the second cage.

These and other features of the invention will be seen from a detailed description of an embodiment of the invention and a description of an alternative staging apparatus and method for that embodiment.

DESCRIPTION OF THE DRAWINGS

FIG. 1A depicts in dashed line side view the front end of a laterally pivotable and longitudinally extendable poultry lifting conveyor boom having poultry gathering heads at the foremost end of the boom;

FIG. 1B depicts in dashed line side view a more rearward portion of the poultry collecting and lifting boom of FIG. 1A with the front of a tractor that mounts the boom visible.

FIG. 1C depicts in dashed line side view the remainder of the poultry collecting and lifting boom of FIGS. 1A and 1B, a transfer conveyor pivotally mounted on remainder of the tractor partially seen in FIG. 1B, and in solid line side view, the poultry distributing and loading portion of this invention and the leading chassis portion of the preferred embodiment cage stager of this invention.

FIG. 1D shows in side view the trailing chassis portion of the preferred embodiment cage stager of this invention.

FIG. 7A shows a leading cage in a place of origin.

FIG. 7C is the same view as FIGS. 7A and 7B but showing the leading cage in the place of filling and the trailing cage at the place of origin.

FIG. 7D is the same view as FIGS. 7A–7C but showing the leading cage moving from the place of filling to the place of destination while the trailing cage remains at the place of origin.

FIG. 7E is the same view as FIGS. 7A–7D and shows the leading cage at the place of destination with the trailing cage at the place of origin.

DETAILED DESCRIPTION OF THE INVENTION

Figure 2:
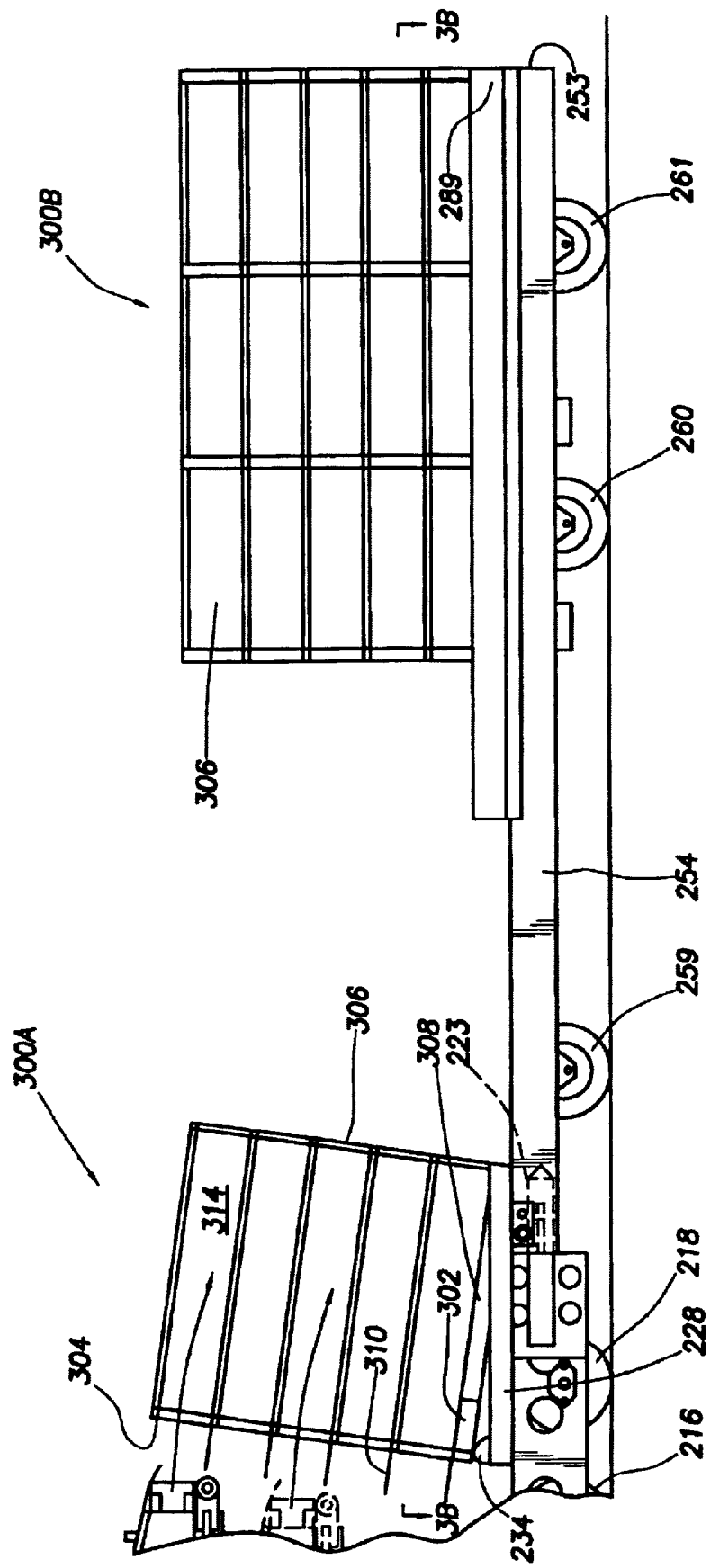
FIG. 2 shows the leading chassis portion of FIG. 1C coupled to the trailing chassis portion of the preferred embodiment cage stager of this invention seen in FIG. 1D, with poultry cages staged on the cage, one positioned at a position of place of origin and the other positioned at a place of filling.

Referring to the figures, reference numeral 10 in FIGS. 1A–1C indicates generally a chicken catching and lifting system in the prior art (shown in dashed line) with which this invention is integrated to have a complete system for catching and caging chickens for live haul transport to processing plants for slaughter and dressing. Reference numeral 100 in FIGS. 1C, 4, 5A, 5B, 6A and 6B indicates generally the poultry batcher loader of this invention. Reference numerals 200A and 200B collectively are reference numeral 200 in FIGS. 2, 3, 3A–3D indicates generally the cage stager of this invention, also seen partially in other figures. In the description which follows, two digit numbers describe elements of the chicken catching and lifting portion of the system of this invention shown in dashed line, three digit numbers in the 100's describe elements in the poultry batcher loader of this invention, and numerals in the 200's describe elements in the preferred embodiment of the stager depicted in FIGS. 2, 3, 3A–3D. Reference numerals in the 300's are used in describing cages. Reference numerals in the 400's are used in describing an alternative staging apparatus depicted in FIGS. 7A–7D.

Poultry are loaded into front-doored multi-compartmented multi-tier poultry cages 300 (see FIGS. 1C, 3A–3D and 6A, 6B) having fork tubes 302 extending along the front 304 and back 306 of the cages at the base 308 of the cages transverse to the direction of opening of the front doors 310 of the cages 300. Fork tubes 302 are interconnected at the base 308 of cage by cross members 312. Compartments are indicated by reference numeral 314.

A chicken catcher and lifter 10 (FIGS. 1A–1C) in the prior art (shown in dashed line) with which the invention is integrated comprises a laterally pivotable and longitudinally extendible conveyor boom 11 having longitudinally separated front end 12 and rear end 14. Boom 11 includes a pair of counter rotating poultry gathering heads 16 at front end 12 for gathering poultry from the floor of a poultry house. Boom 11 is supported at the front end 12 on tired wheels 18 steered by a remotely controlled hydraulically powered steering system of which a hydraulic cylinder and control valves are seen at 20, 21 respectively. Wheels 18 are steered so that boom 11 can be swept left and right, pivoting on a mast 23 standing from pivot plate 22 (FIG. 1C) mounted on a tractor 24, which provides motive force to drive not only the wheels of the tractor but hydraulics used to power other apparatus of the invention as herein more fully described. The counter-rotating poultry gathering heads 16 include distally intermeshing resilient rubber or elastomeric plastic fingers 26 attached at their base to a rotating drum 28. The gathering heads 16 may be raised for clearance and lowered for operation (see FIG. 1A, the two positions being shown in dashed line). An endless conveyor belt 30 is entrained over powered roller 29 and passive end roller 31 with reserve length of the belt 32 circulating off floor under the boom over a take-up roller 34 in a known method so that the boom can be extended or retracted to reach birds without moving tractor 24. Birds captured by gathering heads 16 are urged between the intermeshing fingers of the gathering heads and step onto the continuously moving conveyor belt, which lifts the poultry received from the gathering heads to the rear end 14 of boom 11. The boom is enclosed with side walls and a top to channel the birds to the rear 14.

At the rear 14 of boom 11, the birds transfer from the conveyor belt 30 of boom 11 to a vertically and laterally moveable transferring conveyor belt 36. Tractor 24 pivotingly mounts and supports transferring conveyor 36. A pivot post 38 supports counterweighted arm 37 which supports piston cylinder 39 from which piston rod 40 extends to a support 41 for an extensible and retractable transfer conveyor belt assembly drive in which conveyor belt 36 is entrained over and driven by a powered roller 42 and passes over a passive roller 44 bounded super-laterally by structure forming side walls 46 for moving birds received from lift conveyor 30 to a discharge end 48 where conveyor belt 36 ends its forward movement over end roller 44.

Tractor 24 has a hitch post (position indicated generally at 50 but not seen) onto which leading chassis 200A of stager 200 is hitched by a forwardly extending tongue 201 for tow. Leading chassis 200A includes a frame indicated generally by 204 having an imaginary longitudinal centerline (generally and partially indicated by reference numeral 210A in FIG. 3 intermediate leading chassis sides 203A and 203B) and a longitudinally connected front end 205 and rear end 206. Between front end 205 and rear end 206 are a front portion 207 and a rear portion 208. The front portion 207 is between front end 205 and the foremost end 209 of rear portion 208. Rear portion 208 of leading chassis frame 204 mounts (transversely to longitudinal centerline 210A) at least one wheel axle 212 carrying 216, preferably, as shown, tandem axles 212, 214 carrying tired wheels 216, 218, supporting the rear portion 208 of the leading chassis frame 204 above ground level. A rear platform 220 is supported on rear portion 208 leading chassis frame 204 above the tandem axle wheels. As described above, the overhead clearance of a poultry house is limited when catching chickens, and accordingly, the height of platform 220 must be kept as low as possible. The tired wheels 216, 218 for the wheels are therefore preferably of the smallest diameter that can reliably carry an extremely heavy vertical load and still advance over the wood shaving or other yielding litter floor typical of most poultry houses (which may become boggy reducing traction even more if water escapes from poultry waterers that are raised to the ceiling rafters during catching).

Alignment members 222, 223 and connecting L-shaped latching member 224, 225 at the rear 206 of leading chassis frame 204 (see FIGS. 1C and 3) respectively matingly align and latchingly connect leading chassis 200A to trailing chassis 200B. Trailing chassis 200B is seen in side view in FIG. 1D. Alignment male members 222, 223 insert into recessed female tubing members (not seen) on trailing chassis 200B. Once the alignment members matingly align leading chassis 200A to trailing chassis 200B, L-shaped latching members 224, 225 are spread apart to engage vertical tubing frame members of trailing chassis 200B against the outside of the longitudinal arms (longitudinal being from front to rear parallel to centerline 210A) of the latching members 224, 225 and rearward (towards tractor 24) of the transverse arms of latching members 224, 225. A hydraulically powered piston powers the spread of latching members 224, 225 and holds them against the vertical tubing of trailing chassis 200B as described. Referring back to forwardly extending tongue 201 of leading chassis 200A, the connection of leading chassis 200A to trailing chassis 200B is further described. In the process of mating alignment members 222, 223 with the female tubing of trailing chassis 200B, trailing chassis 200B is pushed forward to mount the female tubing members onto the male alignment members 222, 223, using a fork lift with its forks lowered on the fork lift mast pressing against the rear 253 of trailing chassis 200B, or alternatively, the fork lift holds stationary the rear 253 of trailing chassis 200B and tractor 24 moving in reverse urges alignment members 222, 223 into the female tubing members of trailing chassis 200B, or a combination of both movements is made. It is necessary for rear 206 of leading chassis 200A and front end 252 of trailing chassis 200B to be level on completion of coupling of leading chassis 200A and trailing chassis 200B. To assure they are level, a hydraulic cylinder 211 has its rear end (facing away from tractor 24) attached to a lower support sub-frame or base 240 and the piston rod of the cylinder rod attached to the upper end of lever 213. The lower end of lever 213 is pivotally connected to tongue 201. Extension of the piston rod pivots lever 213 to press down on tongue 201. Pressing down on tongue 201 kicks up the rear end 206 of leading chassis 200A and assists vertical alignment of mating members 222, 223 with the receiving members of trailing chassis 200B. The retraction of such piston rod into cylinder 211 pulls level 213 toward it and lifts tongue 201 vertically, lowering the rear 206 of leading chassis 200A, if needed for vertical alignment of the mating alignment members 222, 223.

Figure 3:
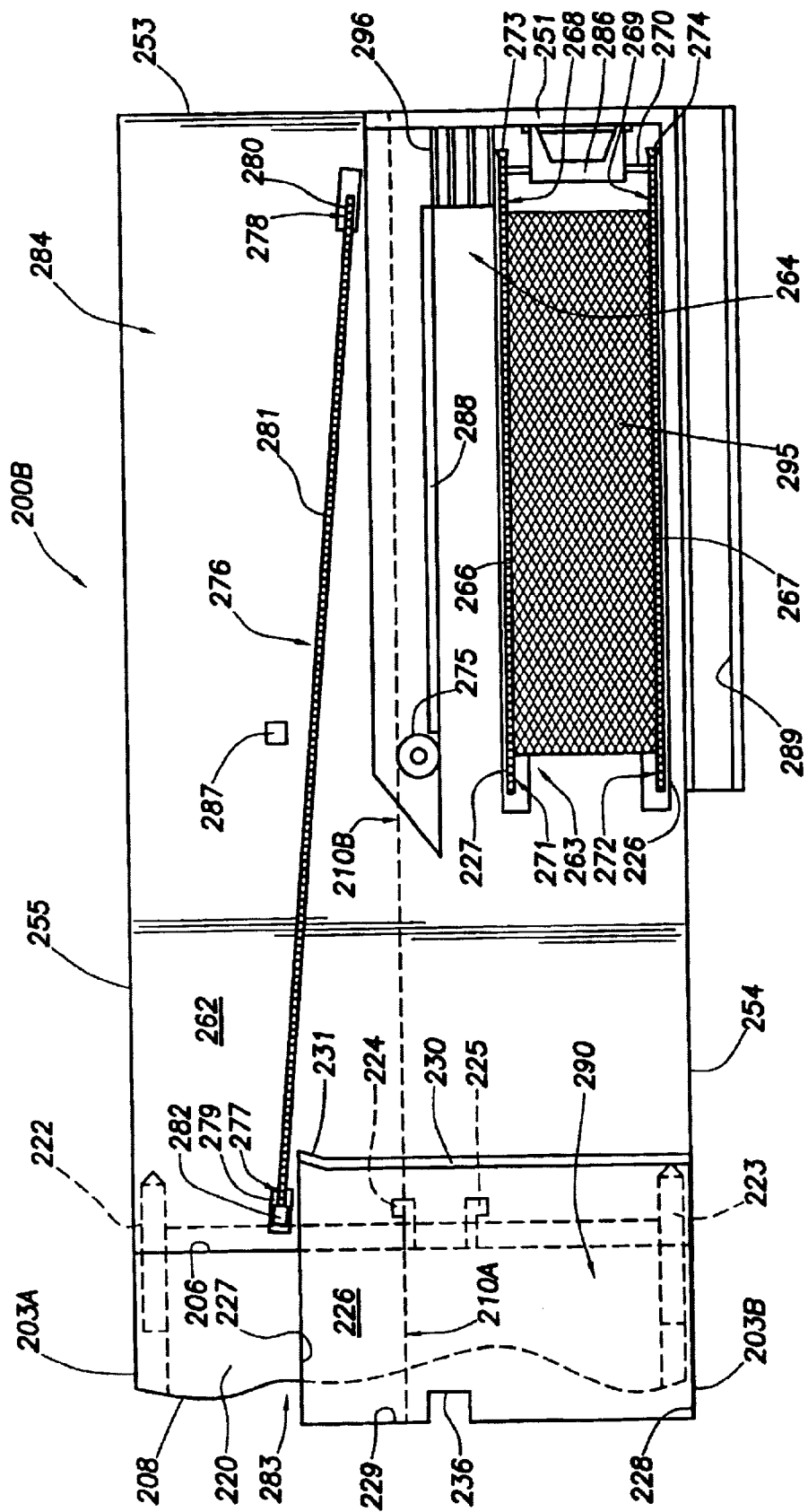
FIG. 3 is a plan view of the coupled leading and trailing chassis of the cage stager of FIG. 2.
Figure 3A:
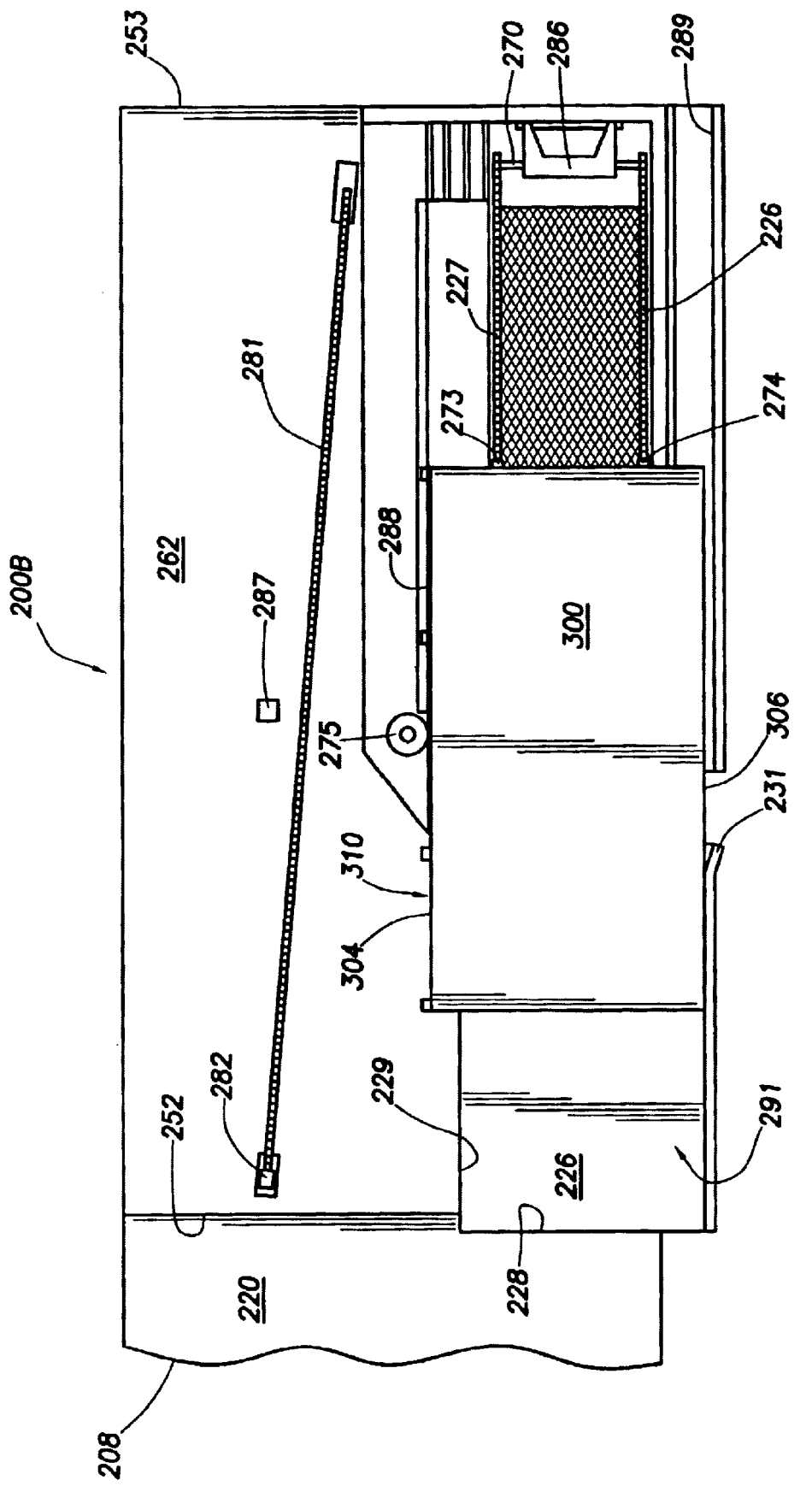
FIG. 3A is a plan view of the coupled leading and trailing chassis of the cage stager of FIG. 3 showing a poultry cage in the process of movement from a place of origin to a place of filling.

Referring to FIGS. 3 and 3A–3D, the join line between front leading chassis 200A and trailing chassis 200B is indicated at 206, the rear end of the leading chassis. A tray 226 is horizontally and pivotally mounted and supported on rear platform 220. The vertical pivoting axis (not shown) for tray 226 is understood on one side of centerline 210A. Tray 226 has a front end 227, a rear end 228, and opposing sides 229, 230. Tray 226 is pivotable to and from a home position 290 as it is shown in FIG. 3, in which the sides 229, 230 are transverse to the imaginary centerline 210A of leading chassis 200A, from and to an away position 291 shown in FIG. 3A in which the sides 229, 230 of the tray are longitudinal to centerline 210A of the leading chassis 200A. Power for pivoting tray 226 is from a hydraulic cylinder/piston/piston rod operatively coupled to a lever arm on a tray pivot shaft extending below the deck of leading chassis 200A. The in-side 229 of tray 226 is closer to leading chassis centerline 210A than the out-side 230 when tray 226 is in the away position 291.

An elevator 234 is attached to the leading chassis frame 204 adjacent the foremost end 209 of rear portion 208 and is elevatable above rear platform 220 under the urging of a hydraulic cylinder/piston/piston rod below the deck of platform 220. The elevator suitably is a lever actuated below deck by a piston or may be a piston rod itself. In-side 229 of tray 226 has an opening 236 through which elevator 234 can elevate above tray 226 when tray 226 is in home position 290. Out-side 230 of tray 220 comprises an upstanding retainer member which flares outwardly at 231 adjacent front end 227. Out-side retainer member 230 braces the base 308 of the cage 300 when cage 300 is tilted up by elevator 234 (see FIGS. 2, 6A and 6B) with tray 226 in home position 290 (FIG. 3).

Referring to FIG. 1C, forward of platform 220 in front portion 207 of leading chassis 200A is a first or lower subframe 240 with connected front and rear ends 241, 242 mounted on leading chassis frame 204 between frame front end 205 and foremost end 209 of rear portion 208. Front end 241 is spaced off frame 204 to a minor acute angle relative to frame 204. A second or upper subframe is indicated at reference numeral 244. A scissors lift assembly 246 powered by a set of hydraulic pistons 248, 249 (see FIG. 4) is connected to upper and lower subframes 240, 244 for lifting or lowering upper subframe 244 relative to lower subframe 240 such that the angle of upper subframe 244 is maintained at the angle of lower subframe 240 throughout the course of lifting or lowering.

Referring to FIGS. 1C, 4, 5A, 5B, 6A, and 6B, reference numeral 100 indicates a poultry batcher and loader of this invention supported on upper subframe 244. Poultry batcher and loader 100 comprises a plurality of poultry receiving bins 102, 103, 104. Each bin 102, 103, 104 has a longitudinally oriented independently operable conveyor belt floor 105, 106, 107. Each conveyor belt 105, 106, 107 has a poultry receiving end 105a, 106a, 107a for receipt of poultry from the transferring conveyor, and a poultry discharging end 105b, 106b, 107b. Conveyor belt 105 is to be understood as comprising and as indicated by reference numerals 105a and 105b. Conveyor belt 106 is to be understood as comprising and as indicated by reference numerals 106a and 106b. Conveyor belt 107 is to be understood as comprising and as indicated by reference numerals 107a and 107b. Bins 102, 103, 104 are arranged side by side such that conveyor belts 105, 106, 107 are substantially parallel. Bins 102, 103, 014 are enclosed at sides 108 and tops 109 except atop the conveyor belt floor at the poultry receiving ends 105a, 106a, 107a, with rear walls 110 adjacent the poultry receiving ends 105a, 106a, 107a. Each bin 102, 103, 104 has a moveable curtain 111, suitably a rubber or elastomeric flap, adjacent the poultry discharging end 105b, 106b, 107b. Curtains 111 have slits upwardly from their bottom ends to subdivide the curtain into a plurality of smaller flaps to reduce resistance to the flow of birds as belt 105, 106, 107 of that curtained bin is rotated to discharge birds from the bin. To each side of a curtain 111 is a rubber or elastomeric flexible forward extension 112 of sides 108 of the bins. The forward extensions 112 provide a side barrier between the bins and the side structure of the loader conveyor when birds are discharged from the bins onto the loader conveyor.

Reference numeral 113 indicates a space frame atop upper subframe 224. Frame unit 113, fenestrated as at 114 to lighten it, carries belt conveyors 105, 106, 107 and the receiving bin structure described in the previous paragraph. A weight measurer 115, suitably one or more load cells, is interposed between upper subframe 224 and frame unit 113 (see FIG. 1C), for measuring the weight of poultry received in one or more of the bins. More than one load cell may be integrated to act as single recorder of weight, or individual load cells may be situated for weighing only birds in a particular bin. A load cell is zero'd to the unloaded weight it supports before addition of any birds. The supported weight, in the case of a plurality of integrated load cells weighing the whole of the receiving bin structure, includes also belt drivers 116, 117, and 118. Individual load cells for discretely measuring the weights of each bin would weigh only the belt driver for the belt of that bin. Belt drivers 116, 117, and 118 are each mounted to roller supports which are in turn supported by space frame 113, and each has a hydraulic motor and its transmission, which is contained within the drive guards seen at 116, 117 and 118. Roller support 198 for belt driver 116 is shown and similar roller supports (not shown) are used for belt drivers 117 and 118. Belt driver 116 rotates driver roller 130, and belt drivers 117 and 118 rotate similar driver rollers (not shown). Drivers 116, 117 and 118 drive respectively poultry receiving bin conveyor belts 105, 106, 107 independently and intermittently. The drivers 116, 117 and 118 operate the conveyor belts 105, 106, 107 at a speed preferably less than the minimum high loading speed. The plurality of integrated load cells measure aggregately the weight of birds loaded into all three of the bins, suitably with a reporter 119, such as a digital read out, for reporting out the total weight of birds measured by weight measurer 115. An audible alarm 197 is suitably coupled with the digital readout to sound when a predetermined weight increment has been added to the space frame and the superstructure it supports. For example, in the case of broiler chickens, typically weighing from about five to seven pounds, when about 100 to 105 pounds are received in a bin, the alarm sounds and an operator is accordingly notified that the bin has received an amount of birds for discharge. If the reporter 119 shows 200–210 pounds, the operator knows two bins are filled. If the reporter 119 shows 300–315 pounds, the operator knows all three bins are full.

Figure 5A:
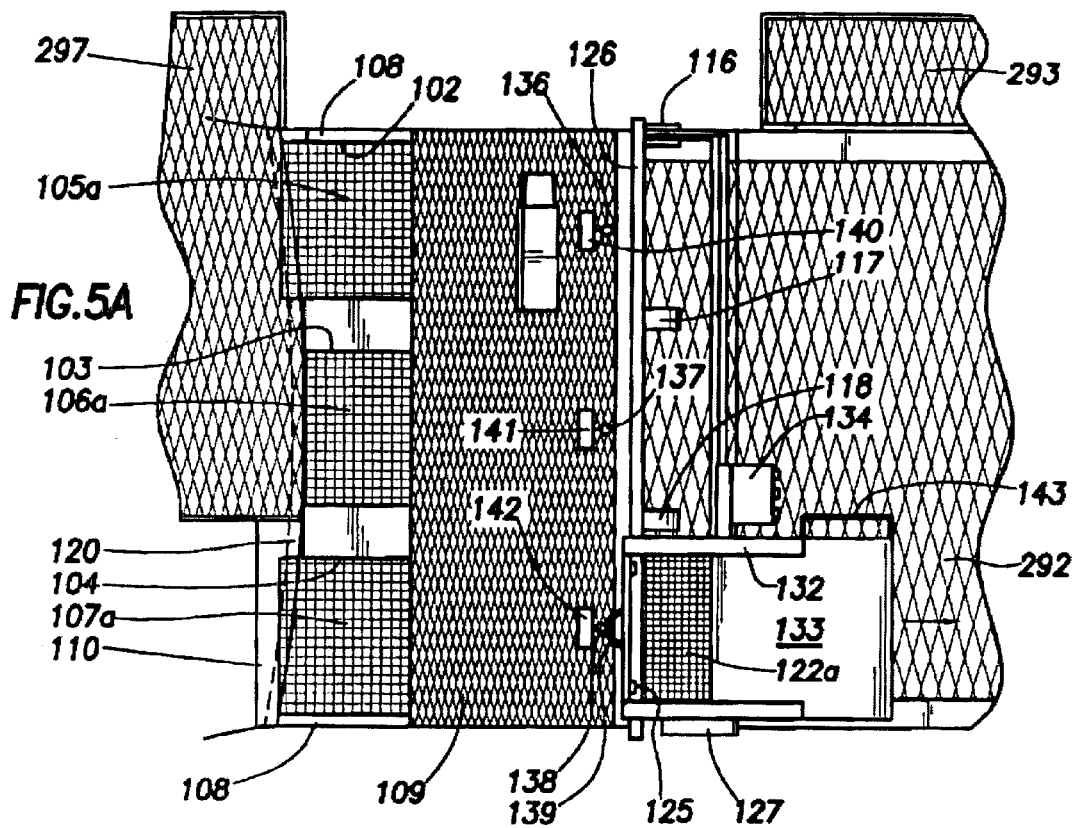
FIG. 5A is a plan view of the poultry batcher/loader of FIG. 4, with an arrow showing the direction of discharge of poultry by the poultry loader.
Figure 5B:
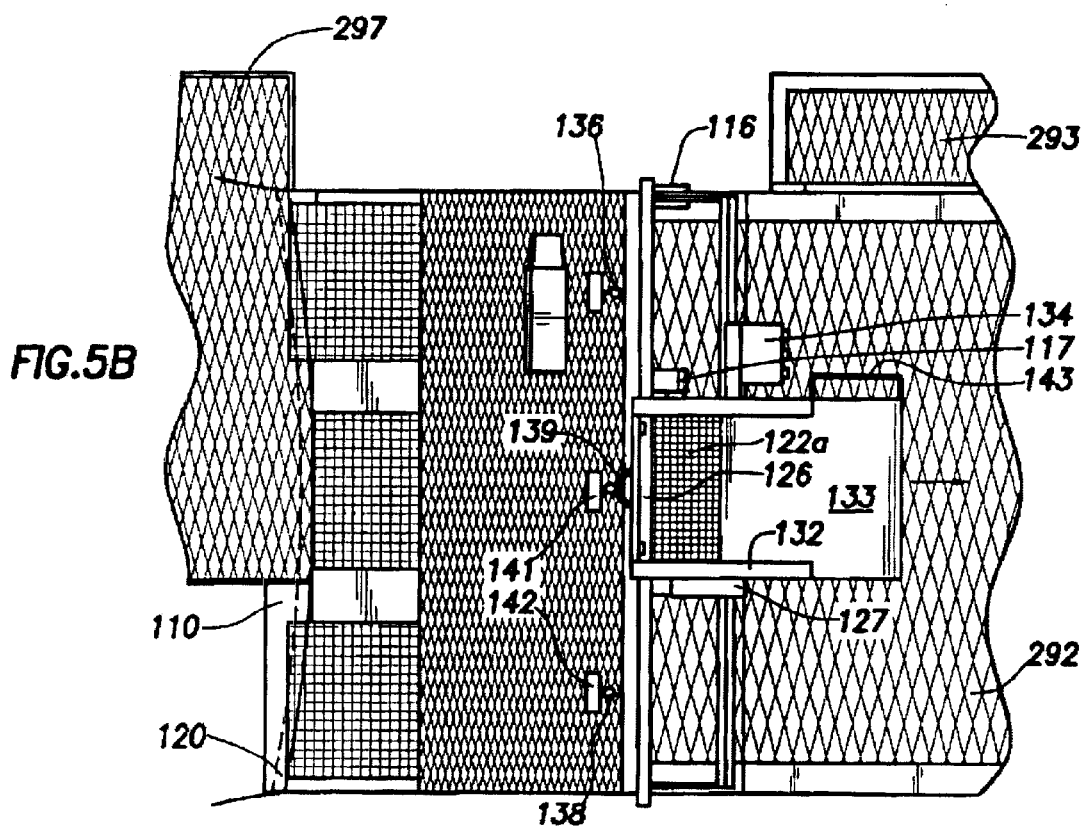
FIG. 5B is a plan view the same as FIG. 5B but showing the poultry loader indexed from the right most position seen in FIG. 5A to the center position seen in FIG. 5B.

An operator manipulates transfer conveyor 36 pivoting it laterally (side to side) to deposit birds discharging off the end of belt 36 into one of the bins 102, 103, 104. Referring to FIGS. 5A and 5B, an arced rail 120 indicates a guide on which the discharge end of transfer conveyor 36 is swung for deposit of birds through the openings over poultry receiving ends 105a, 106a, 107a of bins 102, 103, 105. The operator tasked with this responsibility stands conveniently on deck 297.

Referring back to FIG. 4, poultry batcher and loader 100 further includes a poultry loader 121 comprising a longitudinally arranged conveyor belt floor 122 with a poultry discharging end 122b. A carriage 124 comprises a cantilevered frame hangingly supported on roller bearings, indicated at 125 (FIGS. 5A, 5B) that ride on rail 126 which in turn is fixedly supported by subframe 244. Carriage 124 supports all the structure comprising the unit in which poultry loader conveyor belt 122 resides. Carriage 114 is moveable transversely to the longitudinal direction of conveyor belts 105, 106, and 107 for longitudinal alignment of loader conveyor belt 122 with the individual conveyor belts 105, 106, or 107. A driver indicated at 127 drives the poultry loading conveyor belt 122 and comprises a hydraulic motor and transmission for rotating drive roller (obscured) that rotates loader conveyor belt 122. Driver 127 for loading belt conveyor 122 operates that conveyor at a high loading speed, as described hereinabove. Conveyor belt 122 is enclosed at the sides 129 and with a top 133 that overlies a forward portion of belt 122. A portion of the belt 122 is exposed from the rear of top 133 in order to have access to the receiving end 122a of belt 122. Top 133 tapers towards the discharge end 122B of the loader. The forward end of top 133 is a curved member 133a that smoothly reduces the ceiling to floor dimension at the exit of belt 122. This dimension is selected to be no more than, and preferably a little less than, the vertical opening dimension of the cage compartment to be loaded, to compress the frontal profile of birds being propelled into the compartment from loading conveyor 122.

A control unit 134 is connected to a side 129 of the poultry loading unit. Press buttons 135 control raising and lowering the elevation of the poultry batching and loading unit 100, switching on an enabled receiving unit belt 105, 106, 107 and simultaneously the aligned loader conveyor belt 122, and also controls cage stager operations for advancing an empty cage at a place of origin 264 to a place of filling 283, elevating the front of the cage for a set angle of tilt, and after filling, leveling the cage and moving the filled cage to a place of destination 284 for removal, operations which are explained in detail elsewhere herein. An emergency stop button is advantageously included.

Referring to FIGS. 5A and 5B, an electrical contact alignment switch 136, 137, 138 for each poultry receiving bin is contacted and closed by a bowed leaf spring contact 139 when loader conveyor belt 122 is center aligned with the conveyor belt 105, 106, 107 of that bin to enable the driver 116, 117 or 118 for the aligned belt 105, 106, 107. Thus only the receiving bin belt 105, 106, 107 with which the loader belt 122 is center aligned can be rotated by the operator, using a belt button on the control unit 134. Use of the enabling alignment switch prevents the operator from powering on the receiving bin and loading conveyor belts when the loading conveyor is not totally aligned with the receiving bin. Also seen in FIGS. 5A and 5B is a hooded light diode 140, 141, 142 which indicates the center position of each bin 102, 103 104. Poultry are caught in the dark to take advantage of their roosting behavior, and the light (suitably of a wavelength not perceived by the poultry) is an assist to the operator. A grab rail 143 (FIGS. 5A and 5B) is used by the operator to move carriage 124 transversely to the longitudinal direction of conveyor belts 105, 106 and 107 for longitudinal alignment of loader conveyor belt 122 with the individual conveyor belts 105, 106 and 107. Grab rail 143 is omitted in FIG. 4 for visibility of other structure. The loader conveyor and cage stager operator stands on decks 292 and 293. Deck 293 is fold-up in order to reduce width of chassis 200B for over the road transport.

Referring now to FIGS. 1D, 3, 3A–3D, reference numeral 200B indicates trailing chassis 200B which has been referenced in respect to description of joining it to leading chassis 200A. Trailing chassis 200B comprises a trailing chassis frame 251 having front end 252, rear end 253, and longitudinal sides 254, 255. A longitudinal imaginary centerline between sides 254, 255 is indicated by dashed line 210B on FIG. 3. At front end 252 are mating and cooperating members as described above for the aligning members 222, 223 and latching members 224, 225 for connecting trailing chassis 200B in longitudinal alignment with leading chassis 200A. Trailing chassis frame 251 transversely mounts at least one axle, and as shown three axles 256, 257 and 258, for carrying wheels 259, 260 and 261 for supporting trailing chassis 200B above ground level at the same elevation as the level of leading chassis 200A. A supporting surface or deck 262 is mounted on the trailing chassis frame.

A first cage mover indicated generally by reference numeral 263 is supported by trailing chassis frame 251 in a rear portion of trailing chassis 200B on the same side of trailing chassis centerline 210B where tray 226 on leading chassis 200A is in the away position 291. Such rear portion is a place of origin as that term is used herein and is indicated generally by reference numeral 264.

The first cage mover is a first force transmission movement carrying an engager and situated in such place of origin 264 for engaging a poultry cage 300 placed there with cage fork tubes 302 longitudinally aligned substantially parallel to trailing chassis centerline 210B and with cage doors 310 facing centerline 210B and for moving the engaged cage 300 so aligned toward the front end 252 of trailing chassis 200B and onto tray 226 in the away position 291 on trailing chassis 220B.

The first force transmission drive comprises one or more flexible members of a loop, preferably a pair of chains 266, 267, carried on rotating supports for travel in a forward direction toward front 252 of trailing chassis 200B above surface 262 and for travel in a reverse direction toward rear 253 of trailing chassis 200B under surface 262. More particularly, the rotating supports are spaced chain sprocket wheel pairs 268, 269 on a first sprocket wheel axle 270 affixed to the trailing chassis frame transverse to the centerline, and spaced chain sprocket wheel pairs 271, 272 on a second sprocket wheel axle affixed to trailing chassis frame 251 transverse to the centerline and spaced from sprocket wheel axle 270. A motive driver, suitably a hydraulic motor, not seen, is connected to one or both of such axles for powering turning of at least one of the sprocket wheel pairs 268, 269 and 270, 271. Chains 266, 267 carried on the first and second sprocket wheel pairs 268, 269 and 270, 271 run parallel to centerline 210B of trailing chassis 200B.

A pair of projections 273, 274 are carried by each of the chains 266, 267 at the same points along the length of the chains. The projections constitute engagers, and are of height adapted to press against base 308 of poultry cage 300 placed on rear portion 253 of trailing chassis 200B with cage fork tubes 302 longitudinally aligned substantially parallel to trailing chassis centerline 210B when projections 273, 274 are above surface 262. Between chains 266, 267 is an expanded metal deck portion 295.

Figure 3B:
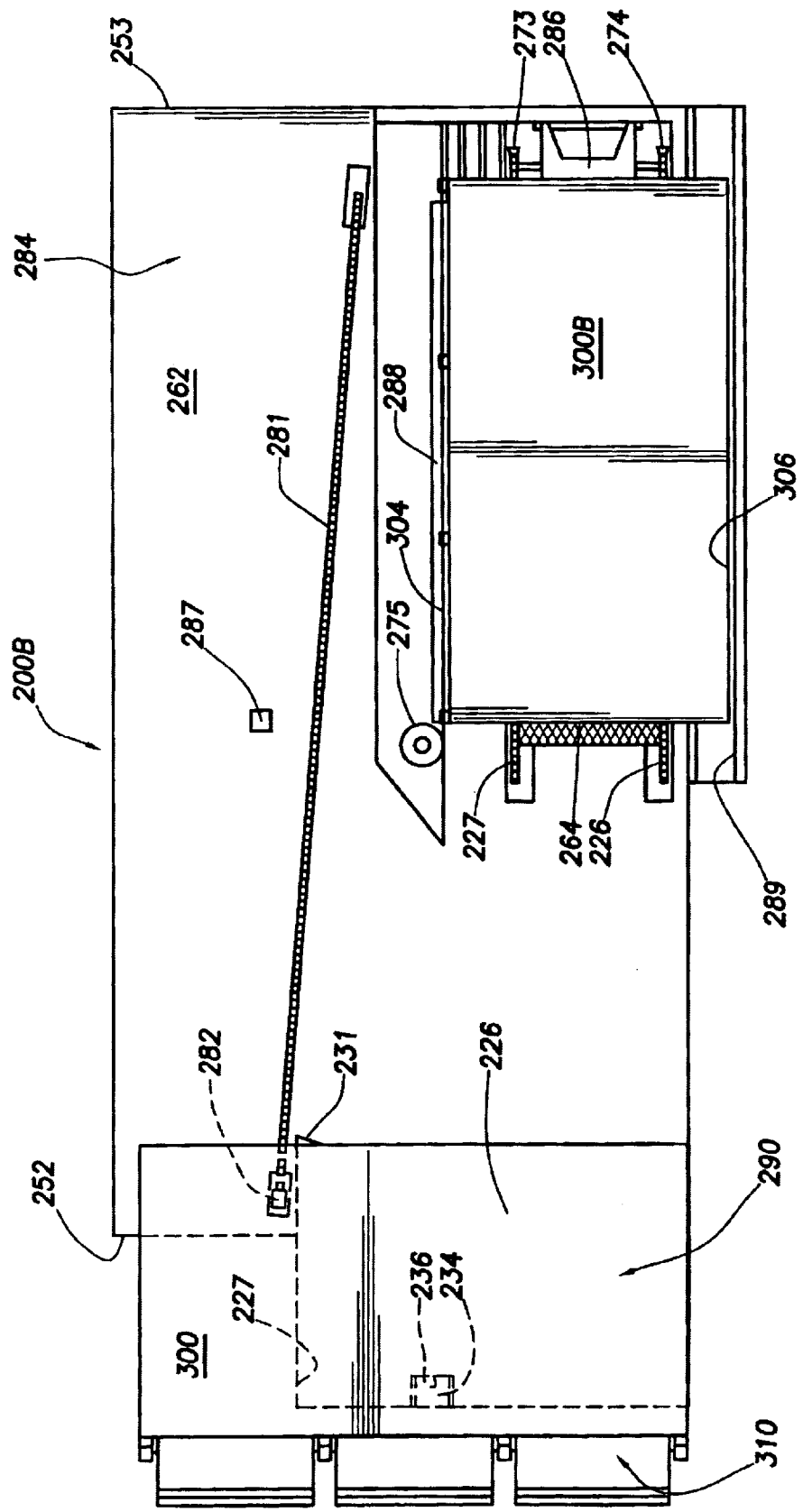
FIG. 3B is a plan view taken along the line 3B of FIG. 2 and shows poultry cages staged on the cage, one positioned at a position of place of origin and the other positioned at a place of filling.
Figure 3C:
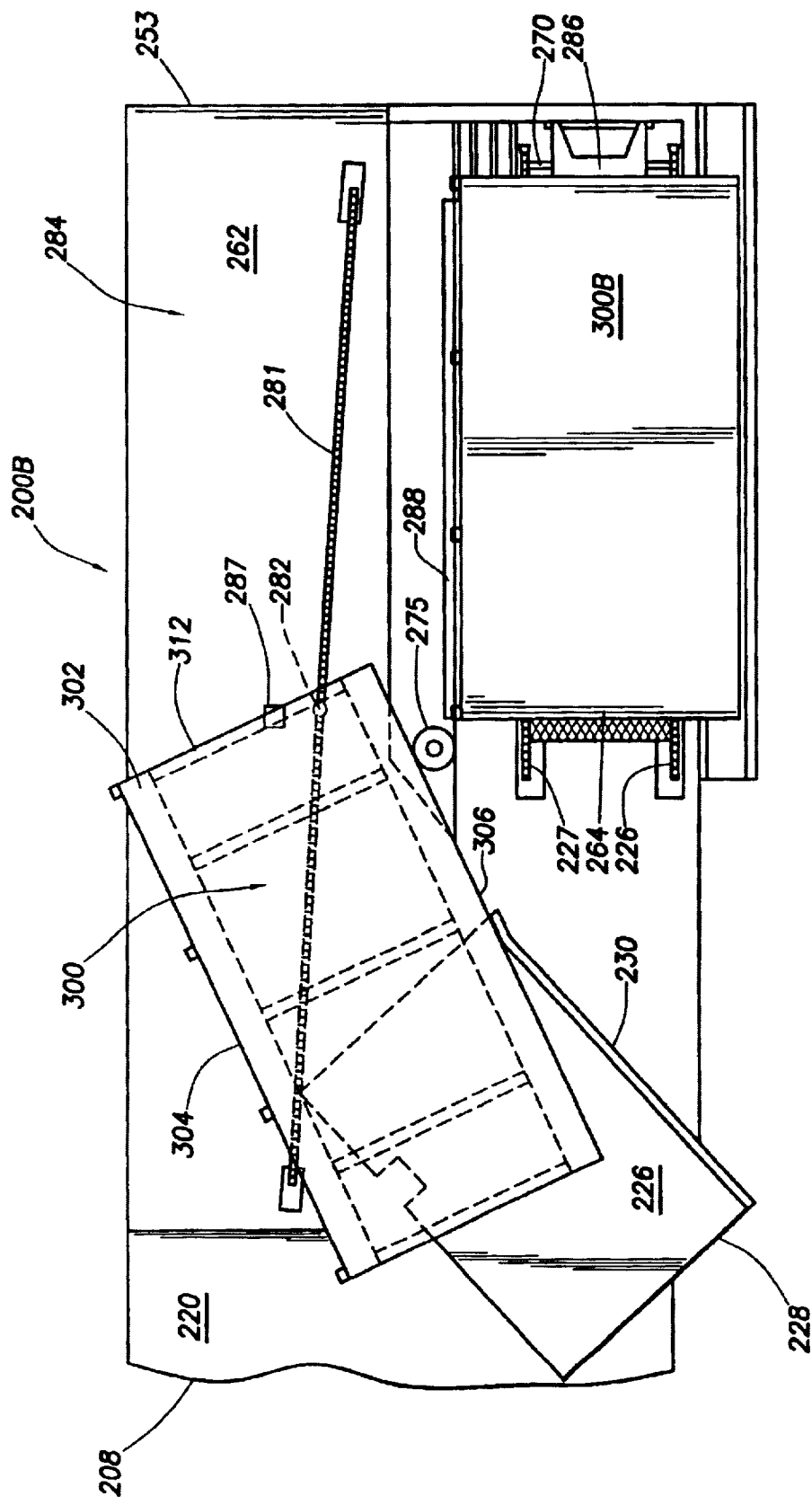
FIG. 3C is a plan view of the stager of FIGS. 2–3B showing movement of a lead cage going from the place of filling to the place of destination on the stager.

When the responsible operator commands cage 300 to be advanced from the place of origin 264 to the place of filling 283, by depressing a button 135 on control unit 134, a hydraulic motor powers rotation of chains 266, 267 and projections 273, 274 engage and move cage 300 on chains 266, 267 toward front end 252 of trailing chassis 200B and toward poultry batcher and loader 100 (FIG. 3A), and onto tray 226 positioned in away position 291. When cage 300 is pushed as far as projections 273, 274 will advance it, it is essentially filly butted against a back lip of end 228 of tray 226 and alongside retainer member 230. Tray 226 is then pivoted a quarter turn counterclockwise (in the embodiment depicted) to home position 290 (see FIG. 3B). At this time a second cage 300B can be deposited onto place of origin 264. Doors 310 are opened (FIG. 3B and the operator depresses a button 135 on control unit 134 to elevate cage 300 to the preset level of tilt, suitably about 12 degrees. As seen in FIG. 3B, in home position 290, tray 226 rested on trailing chassis 200B when tilted and is elevated over the rear portion 220 of leading chassis 200A.

Trailing chassis 200B further optionally comprises a pivot member 275 adjacent and in FIG. 3 partially overlapping trailing chassis centerline 210B. Experience has shown that the pivot is helpful but with careful dimensioning of platform and draw components involved in second cage mover 276, is not always necessary. Pivot member 275 is described as an optional inclusion only.

A second cage mover 276 is located on trailing chassis 200B on the side of trailing chassis centerline 210B opposite cage mover 263. Second cage mover 276 comprises sprocket wheel 277 and sprocket wheel 278 respectively on spaced sprocket wheel axles indicated at 279, 280 and chain 281 carried on sprocket wheels 277, 278 with an upper run of the chain proximate the surface of supporting surface 262. Sprocket wheel axle 279 and sprocket wheel 280 are adjacent rear end 253 of trailing chassis 200B. Sprocket wheel axle 280 and sprocket wheel 278 are adjacent front end 252 of trailing chassis 200B. Sprocket wheel axle 279 and sprocket wheel 277 are closer to the trailing chassis frame centerline than sprocket wheel axle 280 and sprocket wheel 278. A projection 282 is carried by chain 281 for pressing against base 308 of a poultry cage 300 when projection 282 is above surface 262 of chassis 200B.

Figure 3D:
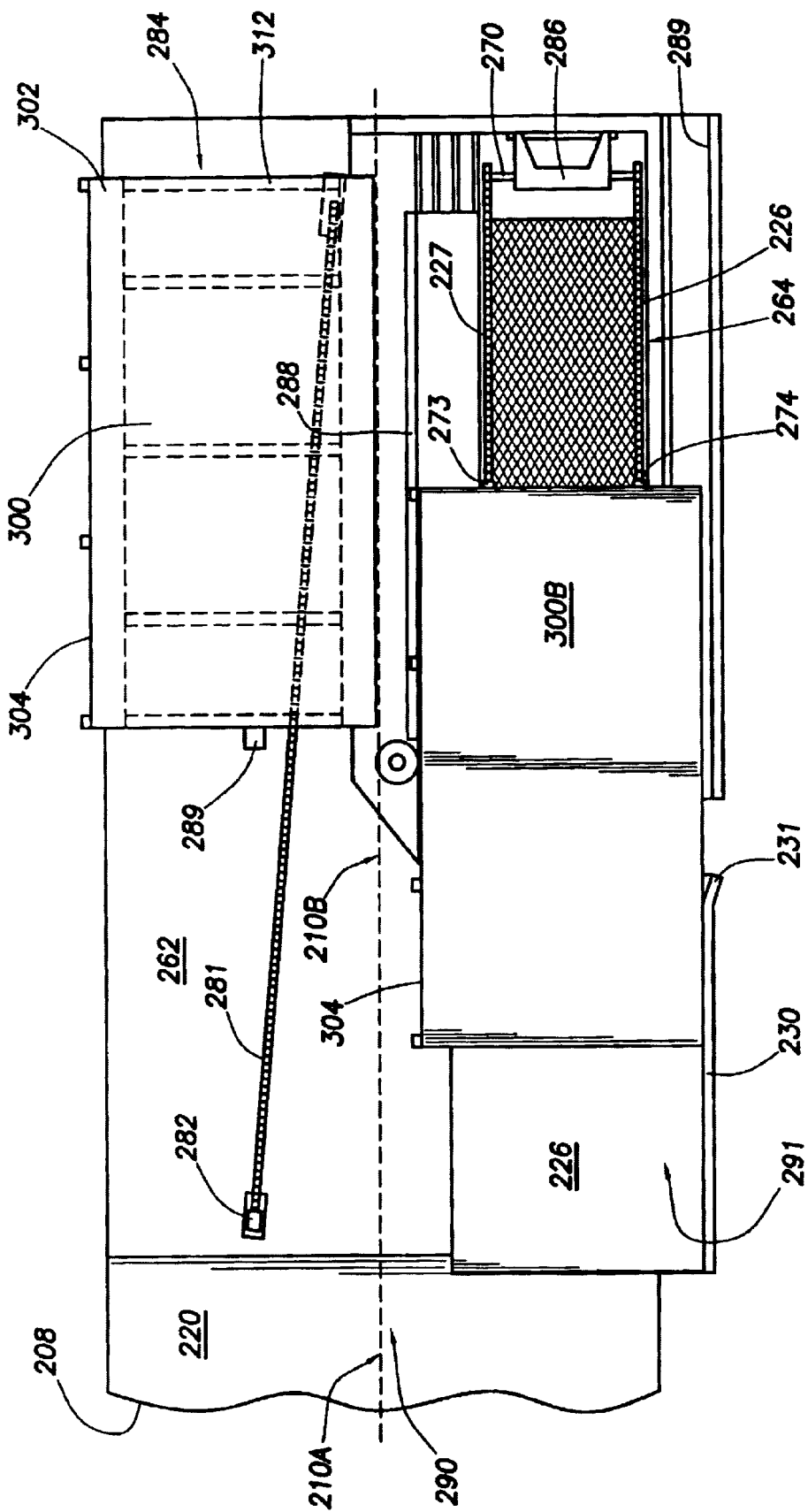
FIG. 3D shows a plan view of the stager of the preceding figures with the lead cage arrived a the place of destination and the trailing cage in the process of transfer from the place of origin to the place of filling.
Figure 4:
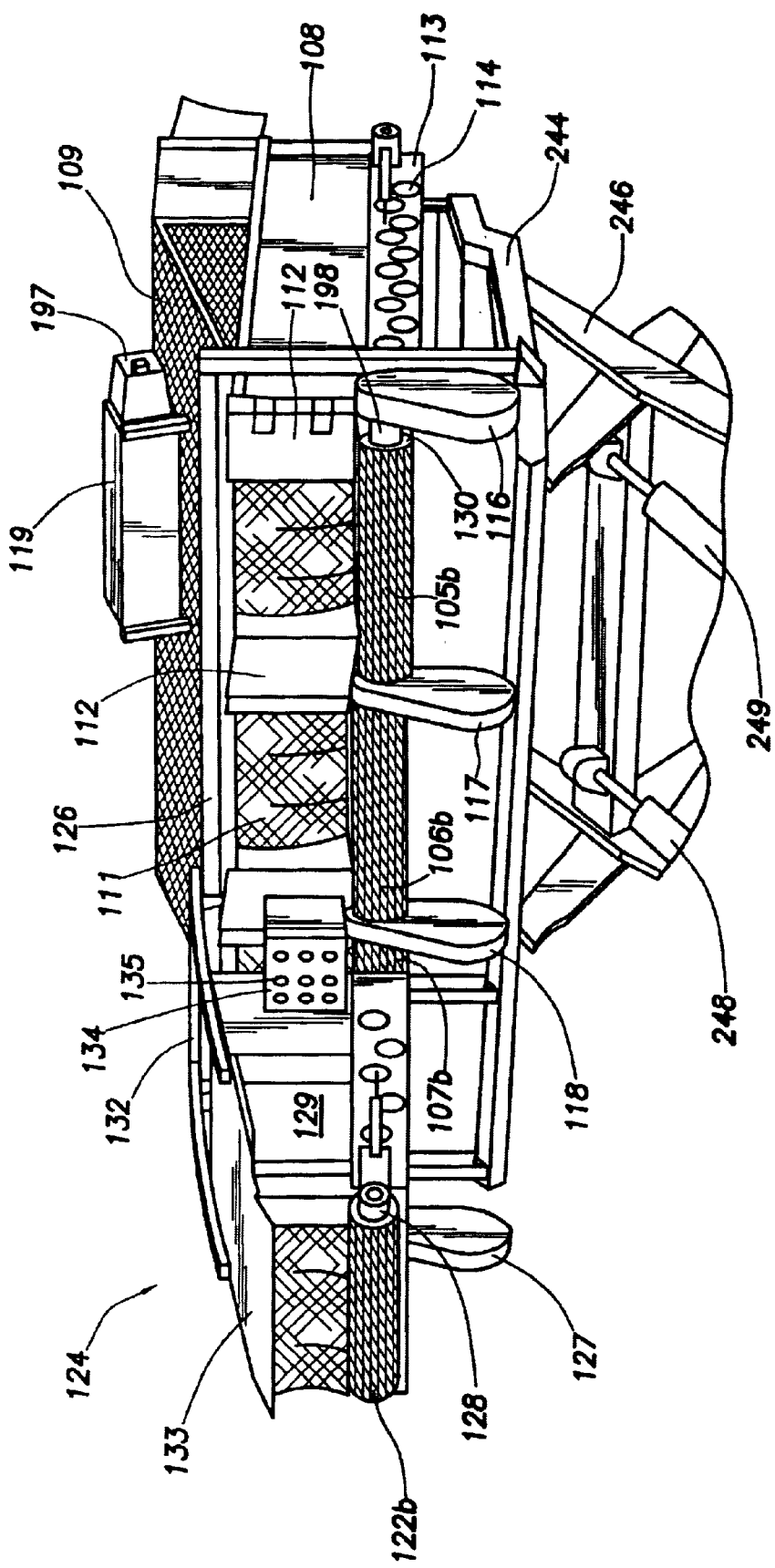
FIG. 4 is a front perspective view of the poultry batcher/loader of this invention.

Projection 282 serves as an engager for engaging cage 300 on tray 226 when tray 226 is in the home position 290 largely on leading chassis 200A. This home position 290 is at the place of filling 283, where poultry are loaded into cage 300. Chain 281 carrying the engager projection 282 acts to engage an outside cross member 312 connecting fork tubes 302 on the underside of cage 300 and move the so engaged cage 300 towards a rear portion or place of destination indicated generally by reference numeral 284 on trailing chassis 200B (see FIG. 3C). Rear portion or place of destination 284 is located on the opposite side of the centerline 210B from the place of origin 264. In pulling cage 300 toward place of destination 284, engager 282 turns front 227 of tray 226 clockwise in the direction of away position 291, optionally suitably also pivoting the back 306 of cage 300 on pivot member 275, and aligns the cage 300 with fork tubes 302 substantially parallel to centerline 210B of chassis 200B when cage 300 is at the rear portion or place of destination 284 with cage doors 310 facing away from centerline 210B (see FIG. 3D). Tray 226 is moved completely to away position 291 (see FIG. 3D) by the hydraulic cylinder actuating it, placing it in ready position for receipt of the trailing cage 300B, as shown in FIG. 3D.

When loading empty cages 300 at the place of origin 264 on trailing chassis 200B, a fork truck driver lowers the cage and to correctly place the cage, backs up until the side of the cage strikes a stop 286, then lowers the cage onto the platform of trailing chassis 200B. When picking you a loaded cage at the place of destination 284, the fork truck driver inserts the forks into fork tubes 302 (FIG. 3D). A depressible stop 287 prevents the cage from being pushed back during fork insertion. Stop 287 is spring loaded so that when loaded cage 300 is being moved from the place of filling 283 to the place of destination 284, it is depressed below the surface of the platform and poses no obstacle to passage of the cage. It springs up after the cage passes over it.

Assisting proper alignment of an empty cage deposited at the place of origin 264 are inside guide rails 288 and outside guide rails 289. Outside guide rails 289 fold up for over the road transport of trailing chassis 200B.

Figure 6A:
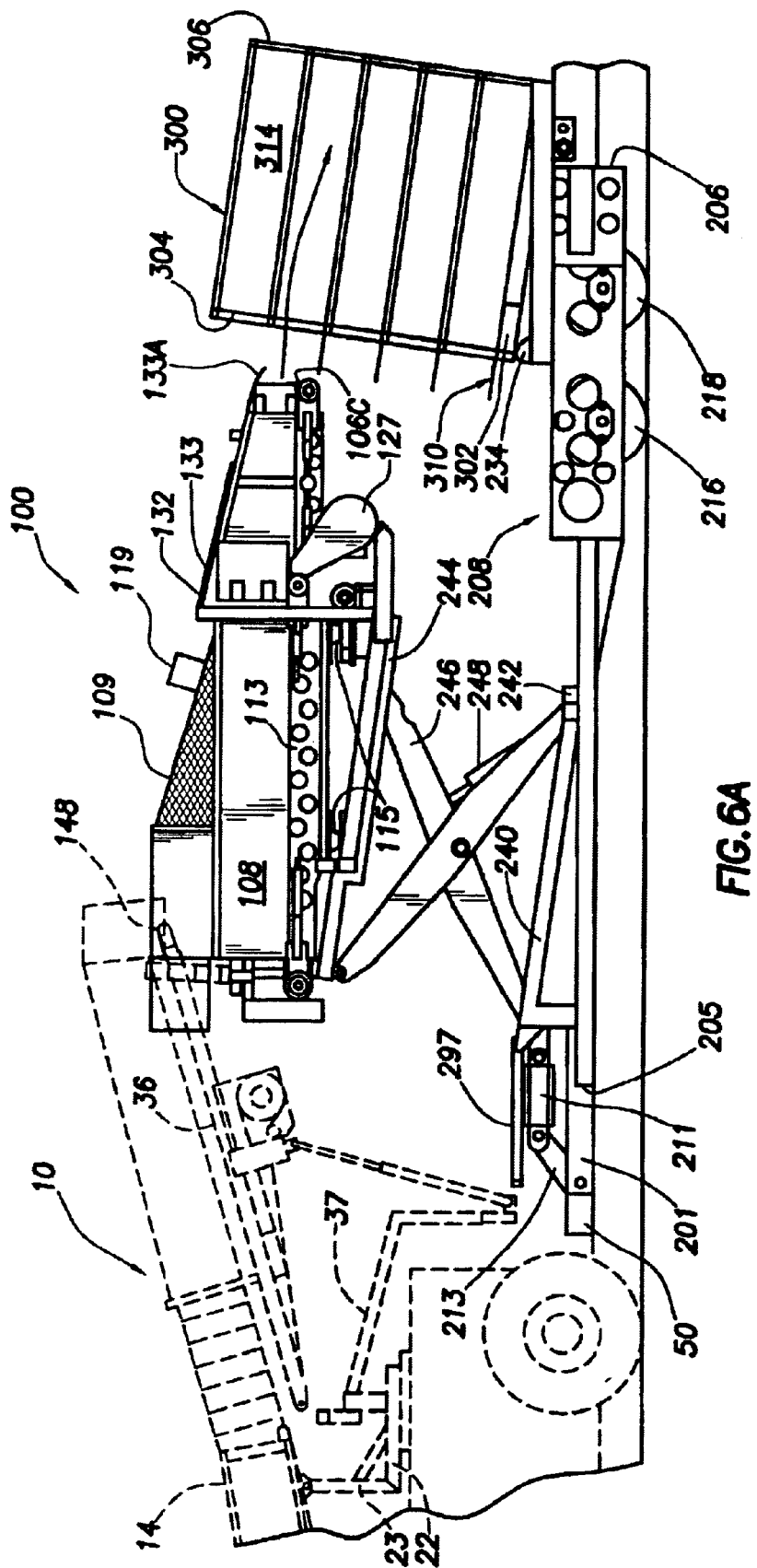
FIG. 6A is the same view as FIG. 1C additionally showing a cage staged on the stager for loading by the batcher/poultry loader of this invention. The poultry loader is at an elevated position for discharge of poultry show by arrow into the fourth tier of the cage.
Figure 6B:
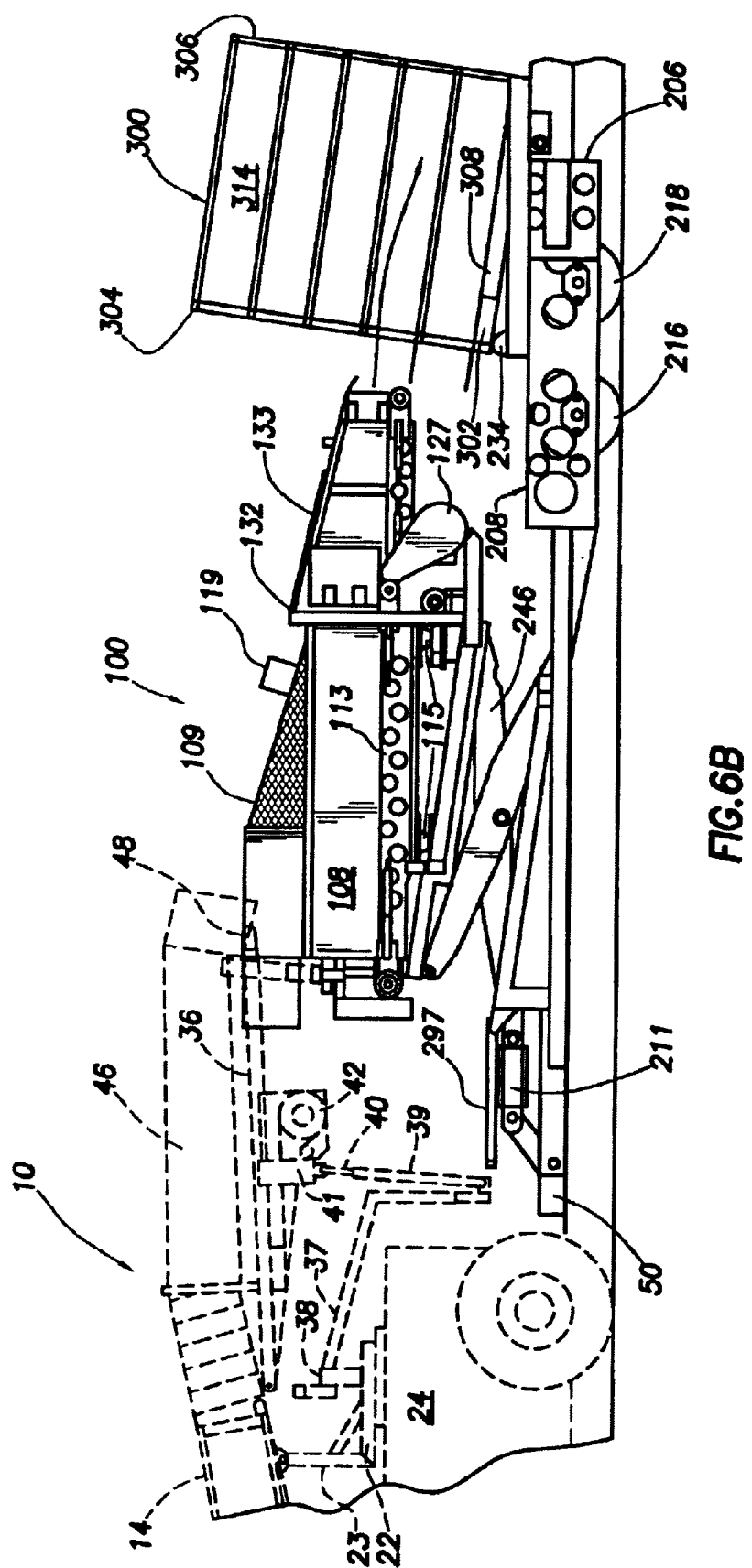
FIG. 6B is the same view as FIG. 6A showing, in this case, the poultry loader at a lowered position for discharge of poultry show by arrow into the second tier of the cage.
Figures 7A, 7B:
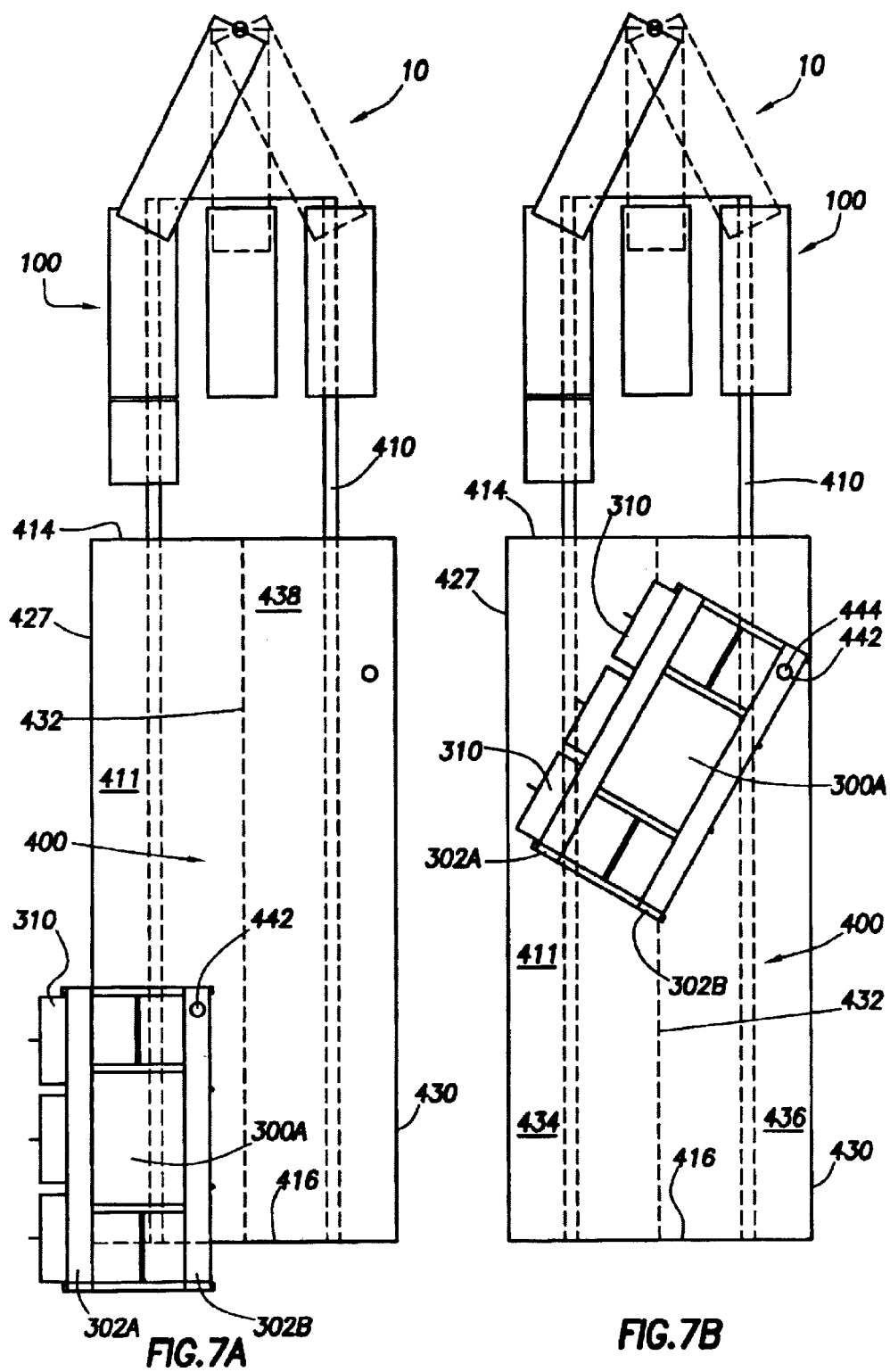
FIG. 7A is a schematic plan view of an alternative stager within the scope of this invention for moving cages on a platform to accomplish the end of receiving filed cages on the platform with their doors oriented in the same position as when the cages were deposited empty on the platform.
FIG. 7B is the same view as FIG. 7B but showing the leading cage moving to a place of filling.

In operation of the foregoing apparatus, a method of picking up poultry from the floor of a poultry house and loading the poultry into a series of front-doored multi-compartmented multi-tier poultry cages 300 having fork tubes 302 extending along the front 304 and back 306 of cage 300 at base 308 of cage 300 transverse to the direction of opening of front doors 310, comprises (a) capturing poultry on the floor of the poultry house with gathering heads 16 of sweeper boom 11; (b) lifting poultry received on extendible conveyor 30 from gathering heads 16 to rear end 14 of the boom; (c) receiving the lifted poultry on transferring conveyor 36; (d) placing a first cage 300A on one side of centerline 210B in a rear portion or place of origin 264 on support surface 262, with cage fork tubes 302 longitudinally aligned substantially parallel to the longitudinal centerline 210B and the cage doors 310 facing the centerline; (e) engaging first cage 300A placed on rear portion or place of origin 264 and moving the engaged cage 300A so aligned toward the front end 252 of chassis 200B and onto tray 226 in an away position 291 of tray 226; (f) moving tray 226 to the home position 290 where the cage doors 310 face the foremost end 209 of rear portion 208 of leading chassis 200A; (g) without regard to operations "(d)"–"(f)", (g)(1) receiving poultry in side by side bins 102, 103 and 104, on substantially parallel conveyor belt floors 105, 106, 107, (g)(2) moving transversely to the longitudinal direction of conveyor belts 105, 106, 107 of bins 102, 103, 104 poultry loading conveyor belt floor 122, and positioning poultry loading conveyor belt floor 122 in longitudinal alignment with the conveyor belt floor of one of the bins 102, 103 and 104 containing poultry, (g)(3) rotating the bin conveyor belt 105, 106 or 107 with which poultry loading conveyor belt 122 is longitudinally aligned, in the direction of the discharge end 105b, 106b or 107b of such bin conveyor belt 105, 106 or 107 with which poultry loading conveyor belt 122 is longitudinally aligned, while maintaining stationary the conveyor belts 105, 106 or 107 of the other of the bins 102, 103 and 104, to selectively discharge the poultry in such bin 102, 103 and 104 with which the poultry loading conveyor belt 122 is longitudinally aligned, (g)(4) receiving the discharged poultry on the poultry loader conveyor belt floor 122 that is in longitudinal alignment with the bin 102, 103 and 104 from which the poultry are discharged; (h) with operations "(d)"–"(f)" and "(g)(1)"–"(g)(4)" of this paragraph completed, and with the door 310 of a compartment of cage 300A facing discharge end 122B of loading conveyor 122 opened, rotating loader conveyor belt 122 in the direction of discharge end 122B to discharge the poultry received on poultry loader conveyor belt floor 122 into the facing compartment of first cage 300A; (i) closing door 310 of the facing compartment of cage 300A; (j) after the poultry are discharged in operation "(h)" into the compartment, moving the poultry loading conveyor belt floor 122 transversely to the longitudinal direction of conveyor belts 105, 106 or 107 and positioning poultry loading conveyor belt floor 122 in longitudinal alignment with the conveyor belt floor 105, 106 or 107 of another of the bin containing poultry, and repeating operations "(g)(3)"–"(g)(4)" and operation "(h)" of this paragraph with respect to another of the bins 102, 103 and 104 containing poultry; (k) repeating operation "(j)" until all compartments 314 in a tier are loaded with poultry (see FIG. 6A, which illustrates doors 310 on tier five having been closed, indicating filling of tier five is complete); (l) adjusting the elevation of the bins 102, 103 and 104 and the poultry loading conveyor belt 122 to match the elevation of a tier of the cage 300 containing one or more empty compartments (illustrated in FIG. 6A); (m) repeating operations "(c)"–"(f)" of this paragraph and if necessary also operations "(g) including "(g)(1)" through "(g)(4)" and operation "(h)" of this paragraph until all empty cage compartments in such empty compartment tier are loaded with poultry (FIG. 6A, showing by arrow discharge of poultry into cage compartments); (n) after completion of operation "(n)" of this paragraph, repeating operations "(l)" and "(n)" of this paragraph (see FIG. 6B showing discharge of birds into a tier two compartment with tiers five, four and three filled, as indicated by closed doors 310) until all tiers of cage 300 are loaded with poultry; (o) with first cage 300A loaded with poultry, engaging cage 300A on tray in the home position 290 with engager projections 266, 267 and operating cage mover 276 to move engaged cage 300A in the direction of the rear 253 of chassis 200B toward the place of destination 284, in so doing turning the front 227 of tray 226 towards the away position 291 and pivoting the base 308 under the back 306 of cage 300A on pivot member 275 to align cage 300A with its fork tubes 302 substantially parallel to the longitudinal centerline 210B of chassis 200B when the cage is at the rear portion or place of destination 284 with the doors 310 facing away from (q) after operation "(e)" with respect to first cage 300A, placing a second cage 300B on centerline 210B; (p) removing first cage 300A from support surface or deck 262; and the rear portion or place of origin 264, with second cage 300B fork tubes 302 longitudinally aligned substantially parallel to centerline 210B of chassis 200B and the doors 310 of the second cage 300B facing centerline 210B, and after commencing operation "(o)" with respect to first cage 300A, performing operations "(e)"–"(p)" on the second cage.

Referring to FIGS. 7A–7E, an alternative embodiment of a stager of this invention is described with reference in which cage deposit onto a towable stager apparatus is oriented with the cage doors to the left. The mirror reverse of this described embodiment is used for cage deposit onto a towable stager apparatus oriented with the cage doors to the right.

In the figures, reference numeral 400 indicates the stager apparatus of this invention, reference numerals 300A and 300B indicate cages staged on the stager 400 and reference numeral 100 indicates a schematic representation of the loading device described in detail above, which is used in conjunction with stager 400 to load cages 300A and 300B.

Stager 400 includes a towable body 411 on a frame 410 that suitably attaches axle pairs 413, 415 (not shown) each mounting wheels and tires 417, 419 (not shown) for tow of stager 400.

Stager 400 stages cages 300A and 300B for frontal filling of the cages. Stager 400 has a front 414, a rear 416, left and right sides 427 and 430 each longer than rear 416, and a centerline 432 (indicated by dashed line). A place of origin 434 is at a first rear location of the stager to one side of the centerline 432 (the left side in the drawings). A place of destination 436 is at a second rear location of stager 400 on the other side of the centerline 432 from place of origin 434 (the right side in the drawings). A first cage 300A is received on a support platform 440 on stager 400 at the place of origin 434 with cage fork tubes 302A, 302B longitudinal to sides 427, 430 and cage doors 310 (shown open) facing a selected side of stager 400 (left side 427 in the figures). In the mirror reverse of this embodiment, right side 430 is the selected side.

A place of cage filling 438 is located at front 414 of stager 400 between sides 427 and 430. Means, suitably a cable or chain draw works acting on platform 440, are provided on stager 400, first, for moving a first cage 300A on platform 440 (obscured under the cage) from place of origin 434 to place of destination 436, thence to place of filling 438. In the course of movement from place of destination 436 to place of filling 438, a semicircular slotted portion 442 of platform 440 is drawn onto a pivot post 444 on stager 400 while drawing cage 300A to front 414. Pivot post 444 is then rotated thereby rotating platform 440 on pivot post 444, and therefore first cage 300A on platform 440, a quarter turn towards front 414. This pivoting rotation is clockwise in FIG. 7B, where the cage doors are oriented at place of origin 436 with the doors facing the left side, and would be counterclockwise in the mirror reverse embodiment where the cage doors are oriented at the place of origin with the doors facing the right side. The quarter turn during movement to front 414 positions first cage 300A on platform 440 in an orientation at place of filling 438 with doors 428 of cage 300A facing towards front 414 of stager 400.

Platform 440 tilted up at the place of filling 438 with an elevator 234 as described in reference to the embodiments disclosed in FIG. 1C and is in readied for filling.

The draw works provided on stager 400 also move first cage 300A from place of filling 438 to place of destination 434, in the course of such movement pivoting platform 440 at slot 442 in the opposite (counterclockwise) direction on pivot post 444, thus rotating first cage 300A on platform 440 a quarter turn towards the aforesaid selected side. Thus this is a counterclockwise quarter turn to left side 427 in FIG. 7D, and a clockwise quarter turn to right side 430 for the mirror reverse embodiment. This positions first cage 300A on platform 440 in an orientation at place of destination 436 with doors 310 of cage 300A facing towards the selected side (left side 427 in FIG. 7E, right side 430 in a mirror reverse embodiment).

The invention is practiced by placing empty first cage 300A on platform 440 at place of origin 434 in rear portion 435 to one side of the centerline 432 of stager 400 with the cage fork tubes 302A and 302B longitudinal to the sides 427, 430 of stager 400 and cage doors 310 facing out towards a selected side of the stager (the left side 427 in the drawings), then moving empty first cage 300A on the platform 440 of stager 400 from place of origin 434 to place of destination 436 at the second rear location of stager 400 on the other side of the centerline 432. Next, empty first cage 300A is moved on stager 400 from place of destination 437 to place of filling 438 at the front 414 of stager 400 between sides 427, 430, in the course of movement to place of filling 438, rotating first cage 300A a quarter turn towards front 414, thereby to position first cage 300A in an orientation at the place of filling 438 with the doors 310 of cage 300A facing towards the front 414 of stager 400. Then at the place of filling 438 the compartments of the first cage 300A are filled with poultry inserted through the portals to the compartments given by opened front doors 428 of the compartments. The filling of the cages is performed using poultry batching and loading device 100 as described above.

After cage 300A is filled (and doors 310 are closed), elevator 234 is then actuated to lower it and level cage 300A. Filled cage 300A on platform 440 is then moved from place of filling 438 to place of destination 437. In the course of this movement, filled first cage 300A is rotated a quarter turn towards the selected side 427, thereby to position filled first cage 300A in an orientation at place of destination 436 with closed doors 310 of cage 300A facing towards selected side 427.

While first cage 300A is at place of filling 438, an empty second cage 300B is placed on another platform 440 on stager 400 at place of origin 434, with the fork tubes 302A and 302B of cage 300B longitudinal to the sides 427, 430 of stager 400. As so placed, doors 310 of second cage 300B face out towards the same selected side 427 of stager 400. First (now filled) cage 300A is removed (by forklift) from place of destination 436. The process described above is then carried out with second cage 300B, and another cage is placed on stager 400 at the place of origin 434 while cage 300B is being filled, and so on, until all the cages to be loaded are filled.

We claim:

1. A poultry loader system for loading a series of front-doored multi-compartmented poultry cages, comprising:
   (a) a plurality of poultry receiving bins arranged side by side,
   (b) means structurally associated with said bins for longitudinally removing poultry in one of said bins while not removing poultry from the others of the bins,
   (c) means longitudinally arranged relative to said removing means for receiving said removed poultry directly from said removing means and longitudinally discharging said removed poultry into an open compartment of a transversely facing front-doored compartment of said poultry cage,
   (d) means for staging a series of empty said poultry cages on a platform having a front end and a longitudinal centerline, such that the cage doors face in a selected direction towards or away from said centerline when an empty cage is on a rear portion of the platform on one side of said centerline, face the front end of the platform transversely to the centerline at a front portion of the platform for loading with poultry, and face in the same selected direction towards or away from said centerline at a rear portion of the platform on a side of the centerline opposite from said one side for removal of a loaded cage from said platform.

2. A method of loading poultry in a series of front-doored multi-compartmented poultry cages, comprising:
   (a) placing a first of a series of empty said poultry cages on a platform having a front end and a longitudinal centerline, initially such that the cage is on one side of the centerline with the cage doors facing said centerline, then
   (b) moving the cage to a front portion of the platform transversely to the centerline with the doors facing the front of the platform,
   (c) longitudinally delivering poultry directly and serially into open compartments of said transversely front door facing poultry cage,
   (d) after the cage is loaded with poultry, moving the loaded cage on said platform to the opposite side of the centerline from where the empty cage was initially placed so that the doors of the cage face away from the centerline,
   (e) removing the first cage from the platform,
   (f) at anytime after operation (b), placing a second of said series of empty poultry cages on said platform, such that the second cage is on said one side of the centerline with the cage doors facing said centerline, and then
   (g) repeating steps (b)–(e) with respect to said second cage.

3. The method of claim 2 in which said longitudinally arranged means discharges said poultry at a high loading speed.

4. A method of loading poultry in a series of front-doored multi-compartmented poultry cages, comprising:

(a) placing a first of a series of empty said poultry cages on a platform having a front end and a longitudinal centerline, initially such that the cage is on one side of the centerline with the cage doors facing away from said centerline, thence (b) moving the cage on said platform to the opposite side of the centerline from where the empty cage was initially placed so that the doors of the cage face away from the centerline, thence (c) moving the cage to a front portion of the platform rotating the cage a quarter turn such that the cage is transverse to the centerline and the doors face the front of the platform, (d) longitudinally delivering poultry directly and serially into open compartments of said facing poultry cage, (e) after the cage is loaded with poultry, moving the loaded cage on said platform to said opposite side of the centerline rotating the cage a quarter turn such that the doors of the cage face towards the centerline, (f) removing the first cage from the platform, (g) at anytime after operation (b), placing a second of said series of empty poultry cages on said platform, such that the second cage is on said one side of the centerline with the cage doors facing said away from said centerline, and then (h) repeating steps (b)–(e) with respect to said second cage.

* * * * *